(12) United States Patent
Mizuno et al.

(10) Patent No.: US 9,361,534 B2
(45) Date of Patent: Jun. 7, 2016

(54) IMAGE RECOGNITION APPARATUS USING NEURAL NETWORK PROCESSING

(75) Inventors: Yusuke Mizuno, Osaka (JP); Daisuke Togo, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 213 days.

(21) Appl. No.: 14/236,739

(22) PCT Filed: Jul. 25, 2012

(86) PCT No.: PCT/JP2012/068842
§ 371 (c)(1),
(2), (4) Date: Feb. 3, 2014

(87) PCT Pub. No.: WO2013/021823
PCT Pub. Date: Feb. 14, 2013

(65) Prior Publication Data
US 2014/0169631 A1    Jun. 19, 2014

(30) Foreign Application Priority Data

Aug. 5, 2011 (JP) .................................. 2011-172181

(51) Int. Cl.
*G06K 9/00* (2006.01)
*G06K 9/32* (2006.01)
(Continued)

(52) U.S. Cl.
CPC .......... *G06K 9/3241* (2013.01); *G06K 9/00369* (2013.01); *G06K 9/00805* (2013.01); *G06N 3/0481* (2013.01); *G06T 7/0042* (2013.01);
(Continued)

(58) Field of Classification Search
None
See application file for complete search history.

(56) References Cited

U.S. PATENT DOCUMENTS 4,941,122 A * 7/1990 Weideman ........... G06N 3/0454
382/157
5,091,864 A * 2/1992 Baji ....................... G06N 3/063
706/42
(Continued)

FOREIGN PATENT DOCUMENTS

JP          5 20455        1/1993
JP       06119454 A   *   4/1994
(Continued)

OTHER PUBLICATIONS

International Search Report Issued Oct. 9, 2012 in PCT/JP12/068842 Filed Jul. 25, 2012.
(Continued)

*Primary Examiner* — Wenpeng Chen
(74) *Attorney, Agent, or Firm* — Oblon, McClelland, Maier & Neustadt, L.L.P.

(57) ABSTRACT

An image recognition apparatus determines whether an image of a pedestrian is captured in a frame of video data captured by a vehicle mounted camera. A pre-processing unit determines a detection block from within a frame, and cuts out block image data corresponding to the detection block from the frame. Block data with a predetermined size that is smaller than the size of the detection block is created from the block image data. A neuro calculation unit executes neuro calculation on the block data, and calculates an output synapse. A post-processing unit determines whether a pedestrian exists within the detection block on the basis of the output synapse. When a pedestrian is detected, the post-processing unit creates result data, which is obtained by superimposing the detection block within which the pedestrian was detected onto the frame.

23 Claims, 23 Drawing Sheets

(51) Int. Cl.
*G06N 3/04* (2006.01)
*G06T 7/00* (2006.01)

(52) U.S. Cl.
CPC ............... *G06T2207/10016* (2013.01); *G06T 2207/20076* (2013.01); *G06T 2207/20081* (2013.01); *G06T 2207/20084* (2013.01); *G06T 2207/20192* (2013.01); *G06T 2207/30196* (2013.01); *G06T 2207/30252* (2013.01)

(56) References Cited

U.S. PATENT DOCUMENTS

| | | | | | |
|---|---|---|---|---|---|
| 5,253,330 | A * | 10/1993 | Ramacher | ............... | G06N 3/04 706/42 |
| 5,440,671 | A * | 8/1995 | Shiratani | ............... | G06N 3/0675 706/40 |
| 5,555,512 | A * | 9/1996 | Imai | ............... | G06K 9/00369 250/342 |
| 5,701,398 | A * | 12/1997 | Glier | ............... | G06K 9/6273 706/20 |
| 5,719,955 | A * | 2/1998 | Mita | ............... | G06N 3/063 382/158 |
| 5,729,623 | A * | 3/1998 | Omatu | ............... | G06K 9/6255 382/135 |
| 5,872,864 | A * | 2/1999 | Imade | ............... | G06K 9/00456 382/156 |
| 5,884,296 | A * | 3/1999 | Nakamura | ............... | G06T 7/402 382/155 |
| 6,026,178 | A * | 2/2000 | Toda | ............... | G06T 1/20 382/158 |
| 6,463,163 | B1 * | 10/2002 | Kresch | ............... | G06K 9/00228 348/169 |
| 6,549,646 | B1 * | 4/2003 | Yeh | ............... | G06K 9/6814 382/132 |
| 7,088,860 | B2 | 8/2006 | Matsugu et al. | | |
| 7,274,819 | B2 | 9/2007 | Matsugu | | |
| 7,496,546 | B2 * | 2/2009 | Hoya | ............... | G06N 3/04 706/15 |
| 7,512,271 | B2 | 3/2009 | Matsugu et al. | | |
| 7,643,702 | B1 * | 1/2010 | Brandt | ............... | G06K 9/00986 382/190 |
| 8,358,342 | B2 * | 1/2013 | Park | ............... | G06K 9/00771 348/136 |
| 8,391,306 | B2 | 3/2013 | Ito et al. | | |
| 2003/0007674 | A1 * | 1/2003 | Tsujii | ............... | G06T 7/0012 382/132 |
| 2003/0194124 | A1 * | 10/2003 | Suzuki | ............... | G06T 7/0012 382/156 |
| 2004/0034611 | A1 * | 2/2004 | Kee | ............... | G06K 9/00281 706/20 |
| 2004/0161134 | A1 * | 8/2004 | Kawato | ............... | G06K 9/00228 382/118 |
| 2006/0197845 | A1 * | 9/2006 | Masaki | ............... | G06T 7/20 348/224.1 |
| 2007/0206849 | A1 * | 9/2007 | Sakata | ............... | G06K 9/00805 382/157 |
| 2007/0208678 | A1 * | 9/2007 | Matsugu | ............... | G06N 3/049 706/18 |
| 2008/0062275 | A1 * | 3/2008 | Miyazaki | ............... | G03B 7/28 348/229.1 |
| 2009/0033745 | A1 * | 2/2009 | Yeredor | ............... | G01S 3/7864 348/152 |
| 2009/0222388 | A1 * | 9/2009 | Hua | ............... | G06N 5/02 706/12 |
| 2010/0034420 | A1 * | 2/2010 | Xiong | ............... | G06K 9/00771 382/100 |
| 2010/0104266 | A1 * | 4/2010 | Yashiro | ............... | G06K 9/00295 386/201 |
| 2010/0119156 | A1 * | 5/2010 | Noguchi | ............... | H04N 19/46 382/190 |
| 2010/0158398 | A1 * | 6/2010 | Noguchi | ............... | G06T 7/004 382/232 |
| 2010/0214936 | A1 * | 8/2010 | Ito | ............... | G06K 9/00986 370/252 |
| 2011/0222759 | A1 * | 9/2011 | Yokono | ............... | G06K 9/6224 382/159 |
| 2012/0170808 | A1 * | 7/2012 | Ogata | ............... | B60R 21/0134 382/103 |

FOREIGN PATENT DOCUMENTS

| | | |
|---|---|---|
| JP | 7 220087 | 8/1995 |
| JP | 11 120158 | 4/1999 |
| JP | 2003 85560 | 3/2003 |
| JP | 2007 25902 | 2/2007 |
| JP | 2008 21034 | 1/2008 |
| JP | 2009 80693 | 4/2009 |

OTHER PUBLICATIONS

Office Action issued Dec. 22, 2015 in Japanese Patent Application No. 2011-172181 (with English language translation).

* cited by examiner

DETECTION BLOCK BL_A : 32 × 64 (pix)
DETECTION BLOCK BL_B : 64 × 128 (pix)

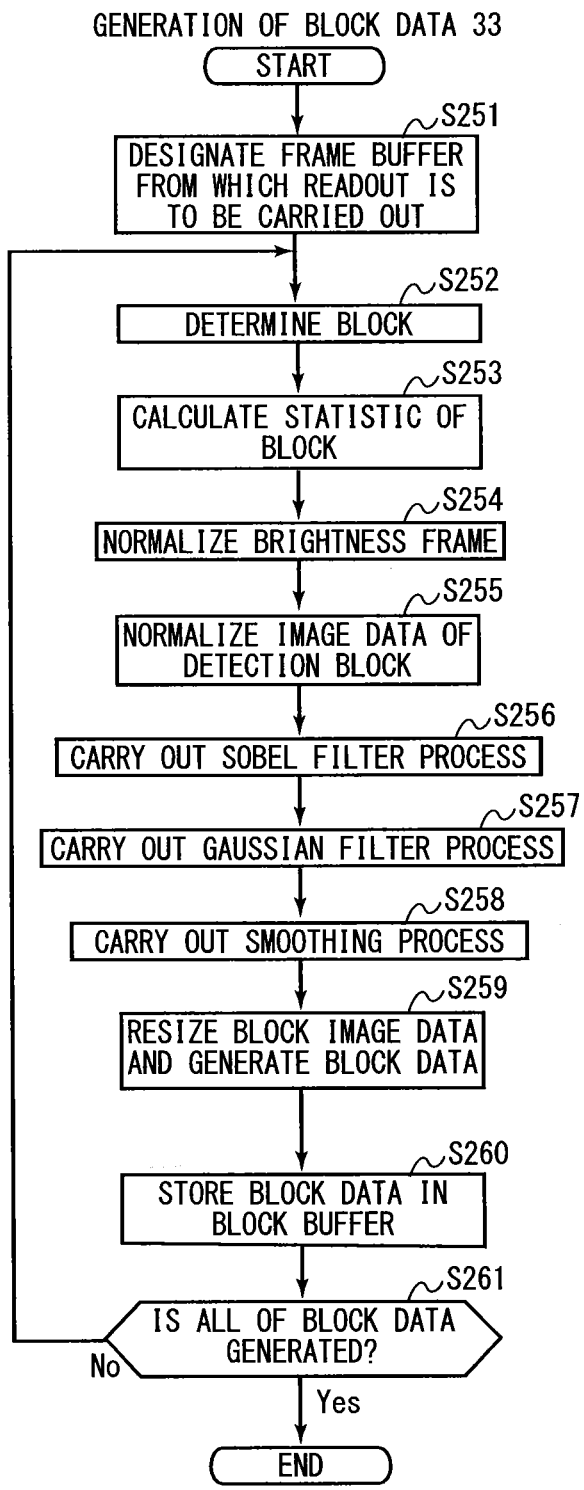

FIG. 7A

BLOCK PARAMETER
TABLE221

| PARAMETER NAME | SET VALUE (pix) |
|---|---|
| BL_START_X | 100 |
| BL_START_Y | 40 |
| BL_SIZE_X | 32 |
| BL_SIZE_Y | 64 |
| BL_OFS_X | 50 |
| BL_OFS_Y | 80 |
| BL_RPT_X | 10 |
| BL_RPT_Y | 5 |

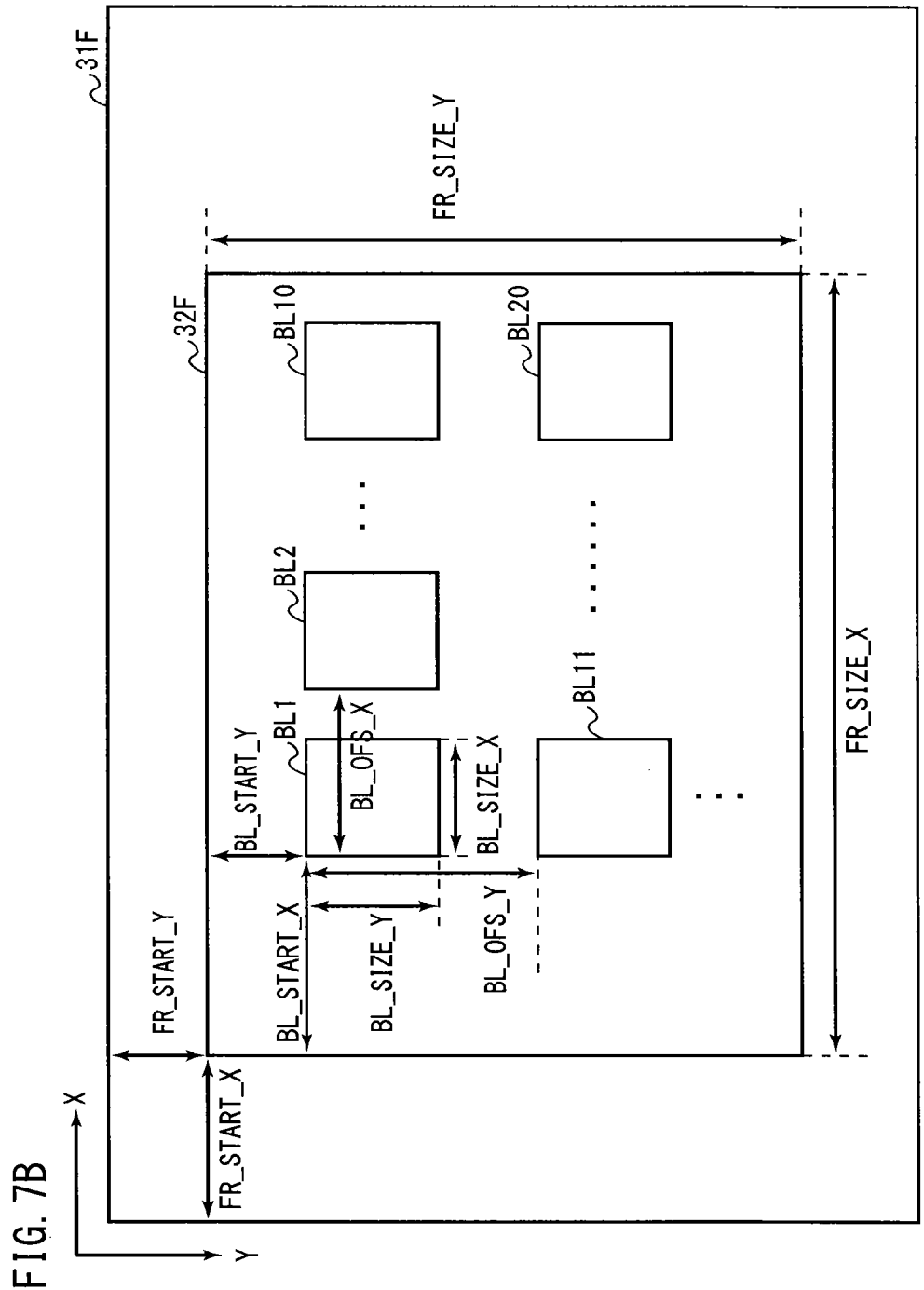

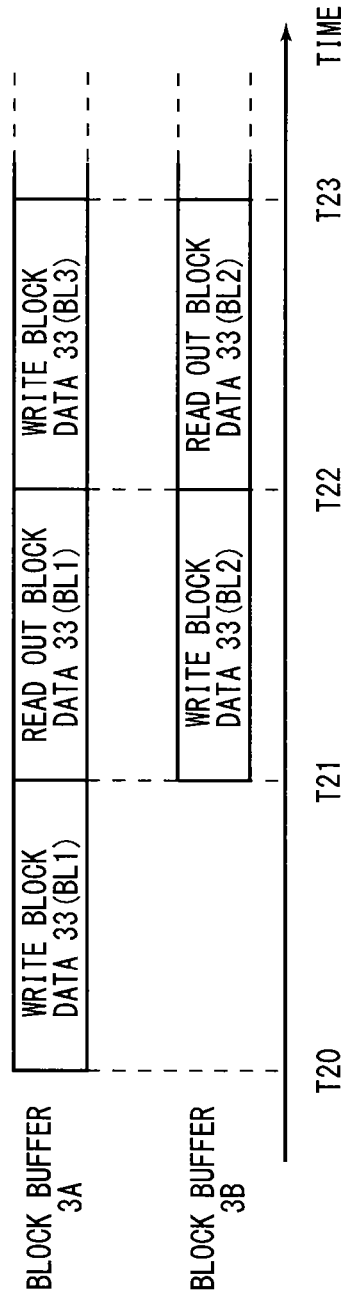

NEURO CALCULATION PROCESS (S3)

IMAGE RECOGNITION APPARATUS USING NEURAL NETWORK PROCESSING

TECHNICAL FIELD

The present invention relates to an image recognition apparatus for detecting an object from an image with the use of a neural network.

BACKGROUND ART

Various methods for safely driving a vehicle such as an automobile have been devised. For example, there has been devised a method in which a camera for photographing the direction of travel of a vehicle is placed and a function of detecting a pedestrian or the like based on an image photographed by the camera is provided to a car navigation system. The car navigation system informs a driver of the presence of a pedestrian when the pedestrian is detected. The driver can drive a vehicle while keeping aware of the movement of a pedestrian.

As a method for detecting a pedestrian from an image photographed by a camera, we have a method using a neural network. A neural network is an information processing system which is created by using a cranial nervous system of a human being as a model, and is employed in not only detection of a pedestrian but also character recognition and the like.
Patent Document 1: Japanese Patent Application Publication No. 2008-21034

Patent Document 1 describes an image recognition apparatus for detecting a pedestrian from an image photographed by a camera mounted on a vehicle. The image recognition apparatus according to Patent Document 1 detects a candidate object which is a candidate for identification, from an input image with the use of a remarkability calculation method. By applying a neural network to a candidate object, whether or not the candidate object is a pedestrian is determined.

However, the quantity of calculation of a neural network (neuro calculation) is enormous. In a case where a pedestrian is detected from an image photographed by a camera with the use of neuro calculation, image recognition processing must be carried out in real time. Accordingly, there is a need to use a large-size hardware for neuro calculation. Also, in a case where neuro calculation is performed by software processing, a processor having a high clock frequency is indispensable, which causes a problem of increased power consumption.

DISCLOSURE OF INVENTION

An image recognition apparatus according to the present invention is for determining whether or not an object which is to be detected is included in a frame, and includes: a pre-processing unit configured to perform neuro calculation on a pixel value of the first calculation image data and generating first calculation image data of a predetermined size smaller than a first area in the frame, from an image in the first area; a neuro calculation unit configured to calculate a neuro calculation value which indicates whether or not the object which is to be detected is included in the first area, by; and a post-processing unit configured to generate result data which indicates whether or not the object which is to be detected is included in the frame by using the neuro calculation value.

By using the first calculation image data of a size smaller than the first area image for neuro calculation, it is possible to reduce a quantity of calculation in neuro calculation. This allows neuro calculation to be performed in real time, and reduces the size of a hardware.

The image recognition apparatus according to the present invention further includes: a first block buffer in which the first calculation image data is stored; and a second block buffer in which second calculation image data generated from an image in a second area different from the first area in the frame by the pre-processing unit, is stored, wherein the pre-processing unit generates the second calculation image data and stores the second calculation image data in the second block buffer when the neuro calculation unit performs neuro calculation by using the first calculation image data stored in the first block buffer, and the pre-processing unit generates the first calculation image data and stores the first calculation image data in the first block buffer when the neuro calculation unit performs neuro calculation by using the second calculation image data stored in the block buffer.

Generation of calculation image data on which neuro calculation is to be performed and neuro calculation can be achieved in parallel, so that image recognition processing can be carried out in real time.

Also, in the image recognition apparatus according to the present invention, the neuro calculation unit is implemented by a configurable processor.

A processor having a lower clock frequency than that in a case where the neuro calculation process is carried out by software processing can be employed. This reduces power consumption in performing neuro calculation.

An object of the present invention is to provide techniques which lead to size reduction of a hardware and allow image recognition processing using neuro calculation to be carried out in real time.

Also, another object of the present invention is to provide techniques which allow for reduction in power consumption in carrying out image recognition processing using neuro calculation.

These and other objects, features, aspects and advantages of the present invention will become more apparent from the following detailed description of the present invention when taken in conjunction with the accompanying drawings.

BRIEF DESCRIPTION OF DRAWINGS

FIG. 6 is a flow chart showing operations of a pre-processing unit shown in FIG. 1 in generating block data.

FIG. 7A shows a block parameter table set in the pre-processing unit shown in FIG. 1.

FIG. 7B shows a correspondence between the detection block shown in FIG. 3A and a block parameter.

FIG. 8 is a timing diagram showing when readout and writing processes are performed on a block buffer shown in FIG. 1.

BEST MODE FOR CARRYING OUT THE INVENTION

Below, a preferred embodiment of the present invention will be described with reference to accompanying drawings.

<1. Overall Structure>

Figure 1:
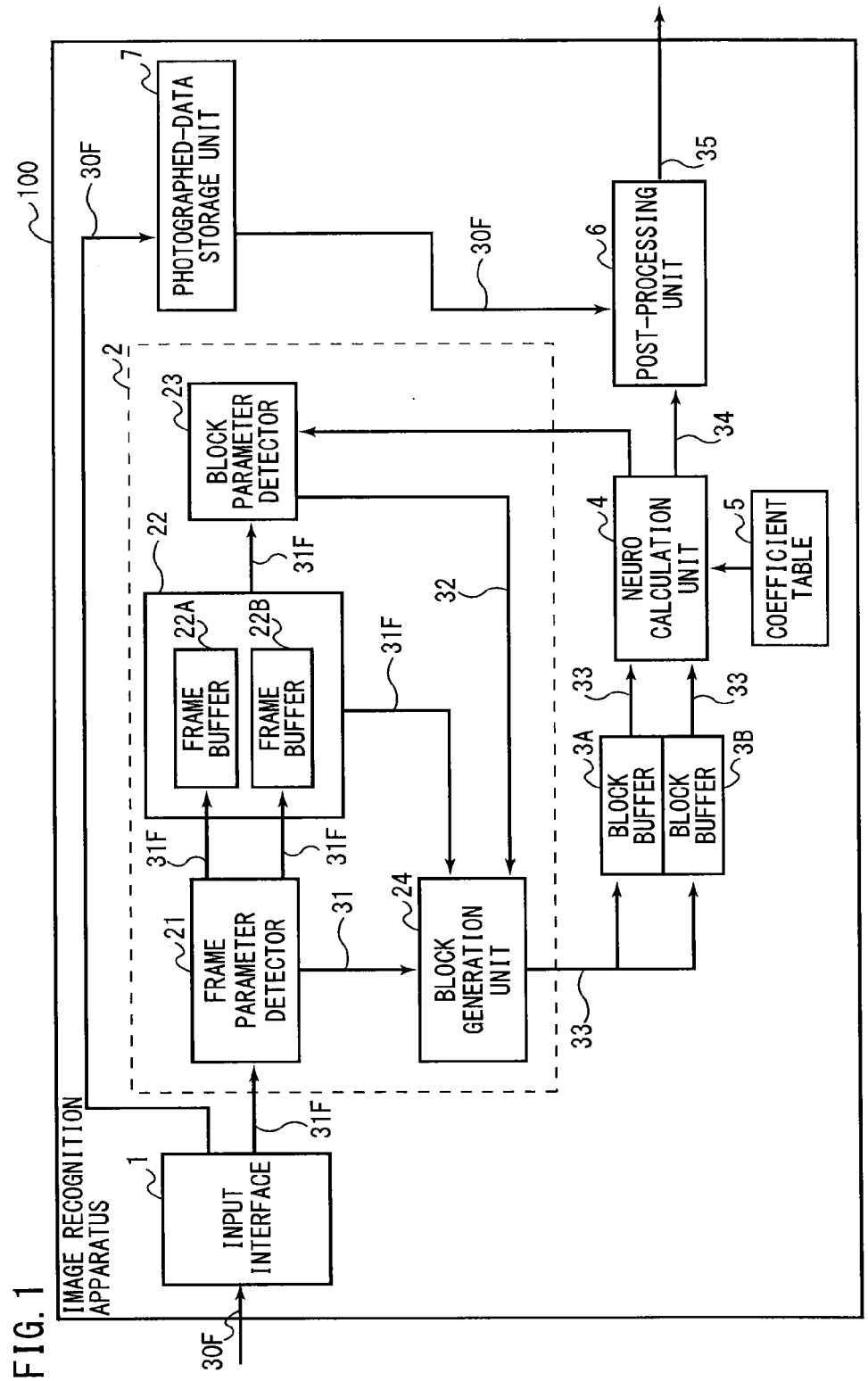
FIG. 1 is a functional block diagram showing a structure of an image recognition apparatus according to a preferred embodiment of the present invention.

FIG. 1 is a functional block diagram of an image recognition apparatus 100 according to a preferred embodiment of the present invention. The image recognition apparatus 100 is mounted onto a vehicle such as an automobile, and receives data of a moving image photographed by a vehicle-mounted camera. The image recognition apparatus 100 detects a pedestrian from each frame of received moving-image data. When pedestrian is detected, the image recognition apparatus 100 displays an area where the pedestrian is detected conspicuously in the received moving-image data, to thereby inform a driver of the presence of the pedestrian.

As shown in FIG. 1, the image recognition apparatus 100 includes an input interface 1, a pre-processing unit 2, block buffers 3A and 3B, a neuro calculation unit 4, a coefficient table 5, a post-processing unit 6, and a photographed-data storage unit 7.

The input interface 1 receives a frame 30F of a moving-image data provided by the vehicle-mounted camera. The input interface 1 extracts a brightness component from the frame 30F, and outputs a brightness frame 31F to the pre-processing unit 2.

The pre-processing unit 2 partitions the brightness frame 31F into blocks each of which has a predetermined size, to generate block data 33. The block data 33 is stored in either the block buffer 3A or 3B.

The pre-processing unit 2 includes a frame parameter detector 21, a frame storage unit 22, a block parameter detector 23, and a block generation unit 24. The frame parameter detector 21 calculates statistical values 31 of pixel values of the brightness frame 31F. The statistical values 31 include the maximum value, a standard deviation, and the like of pixel values. In the frame storage unit 22, the brightness frame 31F received from the frame parameter detector 21 is stored in either a frame buffer 22A or 22B. The block parameter detector 23 identifies a block in which a pedestrian is to be detected, in the brightness frame 31F, and calculates statistical values 32 of pixel values of the block. The block generation unit 24 receives the brightness frame 31F from either the frame buffer 22A or 22B. The block generation unit 24 generates the block data 33 of the block identified by the block parameter detector 23, from the received brightness frame 31F.

The neuro calculation unit 4 receives the block data 33 from either the block buffer 3A or 3B, and performs neuro calculation on the block data 33. As a result of neuro calculation, an output synapse 34 is output from the neuro calculation unit 4. In the coefficient table 5, weighting coefficients used for neuro calculation are stored.

The post-processing unit 6 generates result data 35 by using the frame 30F and the output synapse 34. In the photographed-data storage unit 7, the frame 30F provided by the vehicle-mounted camera is stored without any modification thereto.

<2. Outline of Image Recognition Processing>

Figure 2:
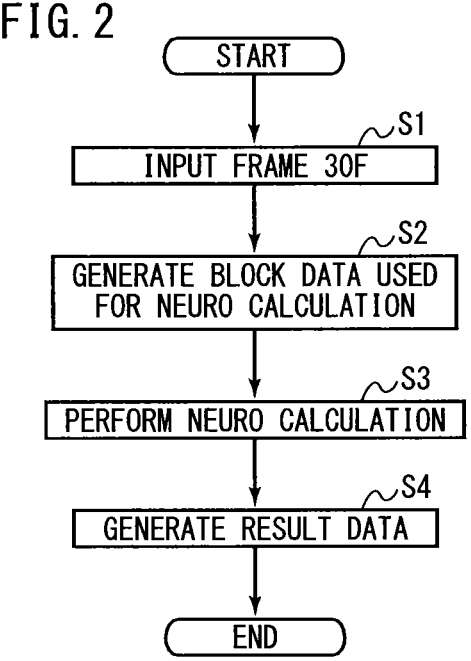
FIG. 2 is a flow chart of image recognition processing carried out by the image recognition apparatus shown in FIG. 1.

FIG. 2 is a flow chart of image recognition processing carried out by the image recognition apparatus 100. Image recognition processing will be outlined with reference to FIG. 2 as below.

The input interface 1 receives the frame 30F (step S1), and extracts the brightness frame 31F. The input interface 1 stores the frame 30F into the photographed-data storage unit 7. The pre-processing unit 2 generates the block data 33 used for neuro calculation, from the brightness frame 31F (step S2). The neuro calculation unit 4 performs neuro calculation on each pixel of the block data 33 (step S3). The post-processing unit 6 determines whether or not a pedestrian is detected based on a value of the output synapse 34. When it is determined that a pedestrian is detected, the post-processing unit 6 generates the result data 35 which is composed by superimposing a block where the pedestrian is detected on the frame 30F (step S4).

Figure 3A:
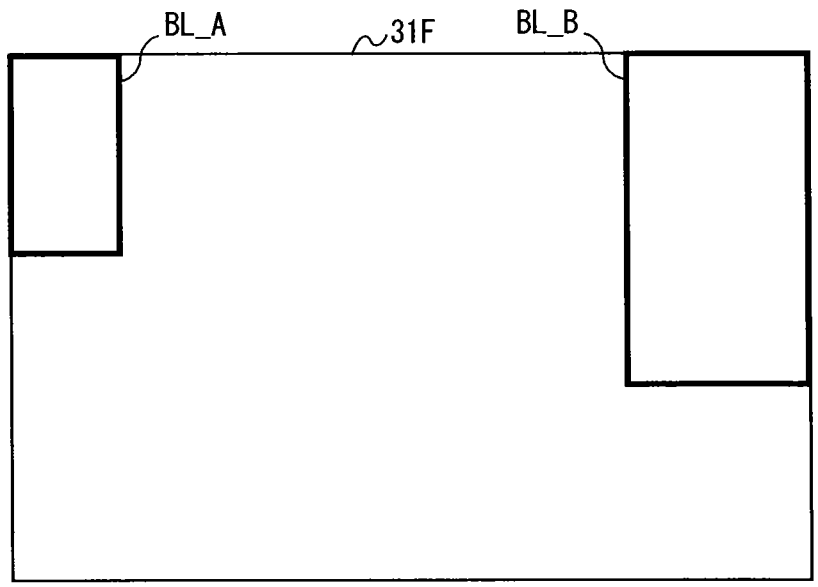
FIG. 3A shows a relationship between a frame shown in FIG. 1 and a block.

Hereinbelow, generation of the block data 33 will be outlined. FIG. 3A shows a relationship between the brightness frame 31F and a detection block. As shown in FIG. 3A, the image recognition apparatus 100 sets a detection block BL_A or BL_B in the brightness frame 31F, as an area where a pedestrian is to be detected.

In FIG. 3A, both of the detection blocks BL_A and BL_B appear on the brightness frame 31F. For actual use, one piece of block data 33 is generated for one detection block. The detection blocks BL_A and BL_B are different from each other in size. The detection block BL_A has 32 pixels along a direction of an X axis and 64 pixels along a direction of a Y axis. The detection block BL_B has 64 pixels along a direction of an X axis and 128 pixels along a direction of a Y axis.

The detection block BL_B is larger in size than the detection block BL_A. The detection block BL_B is set to be larger in order to detect a pedestrian present in the neighborhood of a location of photographing. On other hand, the detection block BLA is set to be smaller in order to detect a pedestrian present at a good distance. To use detection blocks having various sizes allows pedestrians in various places to be detected.

Figure 3B:
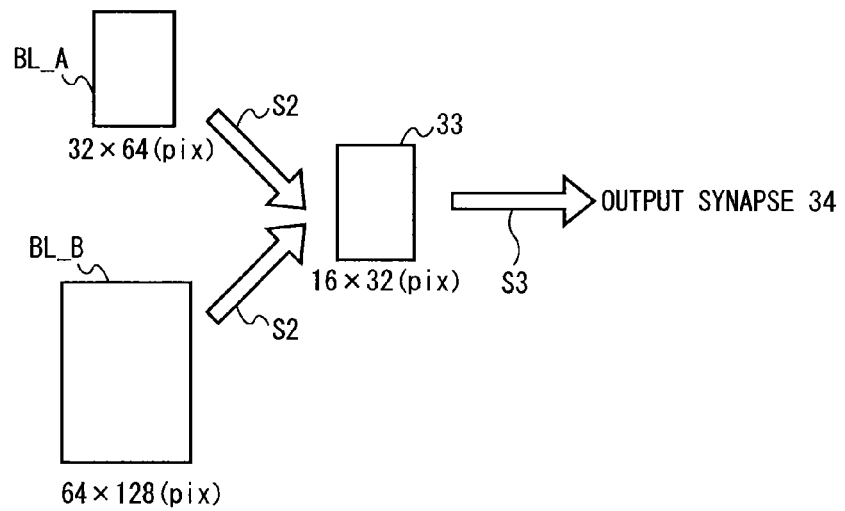
FIG. 3B is a schematic view of a process of generating block data from a detection block shown in FIG. 3A.

FIG. 3B is a schematic view showing processes carried out from generation of the block data 33 to neuro calculation. The pre-processing unit 2 cuts out the detection block BL_A or BL_B from the brightness frame 31F. A size of image data which is cut out is converted into a predetermined size, so that the block data 33 is generated (step S2). The size of the block data 33, which is 16 pixels along a direction of an X axis and 32 pixels along a direction of a Y axis, is constant irrespective of the size of a detection block. The neuro calculation unit 4 performs neuro calculation on the block data 33 (step S3), to generate the output synapse 34. One output synapse 34 is generated for each of detection blocks.

Reasons why the size of the block data 33 is constant will be given. If the number of pixels in the block data 33 varies according to the size of a detection block, the neuro calculation unit 4 must change particulars of a process for neuro calculation according to the number of pixels in the block data. Unlike this, by keeping the size of the block data 33 constant irrespective of the size of the detection block, it is possible to simplify a process for neuro calculation. Also, by reducing the size of the block data 33 to a size smaller than that of the detection block BL_A or BL_B, a quantity of calculation in the neuro calculation process (step S3) is reduced.

Figure 3C:
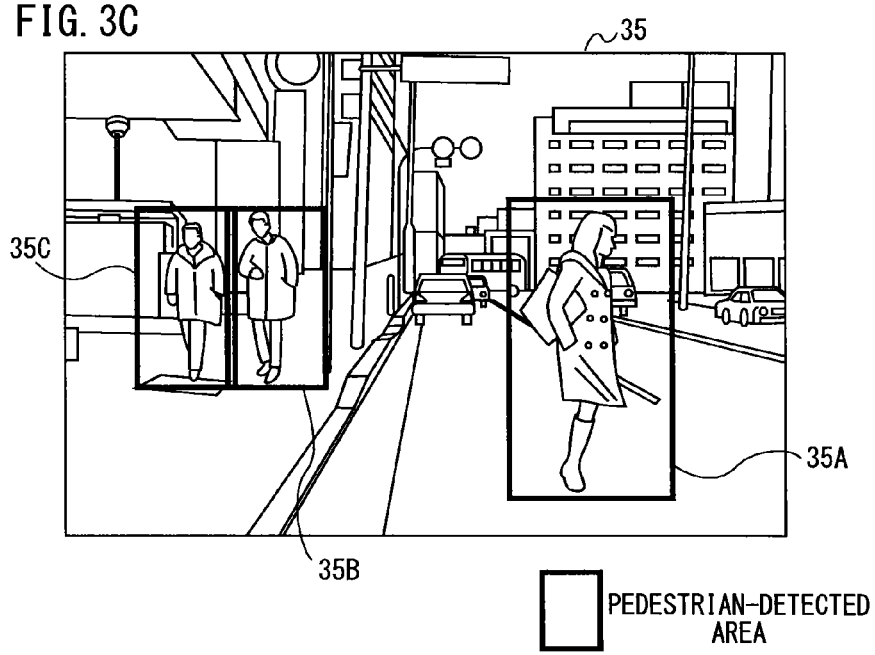
FIG. 3C shows result data generated by a post-processing unit shown in FIG. 1.

Refer back to FIG. 2. The post-processing unit 6 generates result data using the frame 30F and the output synapse 34 (step S4). The post-processing unit 6 determines whether or not a pedestrian is detected from a corresponding detection block, based on the volume of the output synapse 34. FIG. 3C shows one example of the result data 35. If a pedestrian is detected, the post-processing unit 6 acquires the frame 30F from the photographed-data storage unit 7. The post-processing unit 6 draws boxes 35A, 35B, and 35C which respectively correspond to detection blocks in each of which a pedestrian is detected, on the frame 30F, to generate the result data 35. The result data 35 appears on a display furnished in the vehicle, so that the driver can recognize positions of pedestrians.

<3. Operations of the Pre-Processing Unit (Step S2)>

Hereinbelow, operations of the pre-processing unit 2 which carries out the step S2 (refer to FIG. 2) will be described in detail. First, the frame parameter detector 21 performs calculation of the statistical values 31 of the brightness frame 31F. Next, the block parameter detector 23 and the block generation unit 24 generate the block data 33 from the brightness frame 31F.

<3.1. Processes Carried Out by the Frame Parameter Detector 21>

Figure 4:
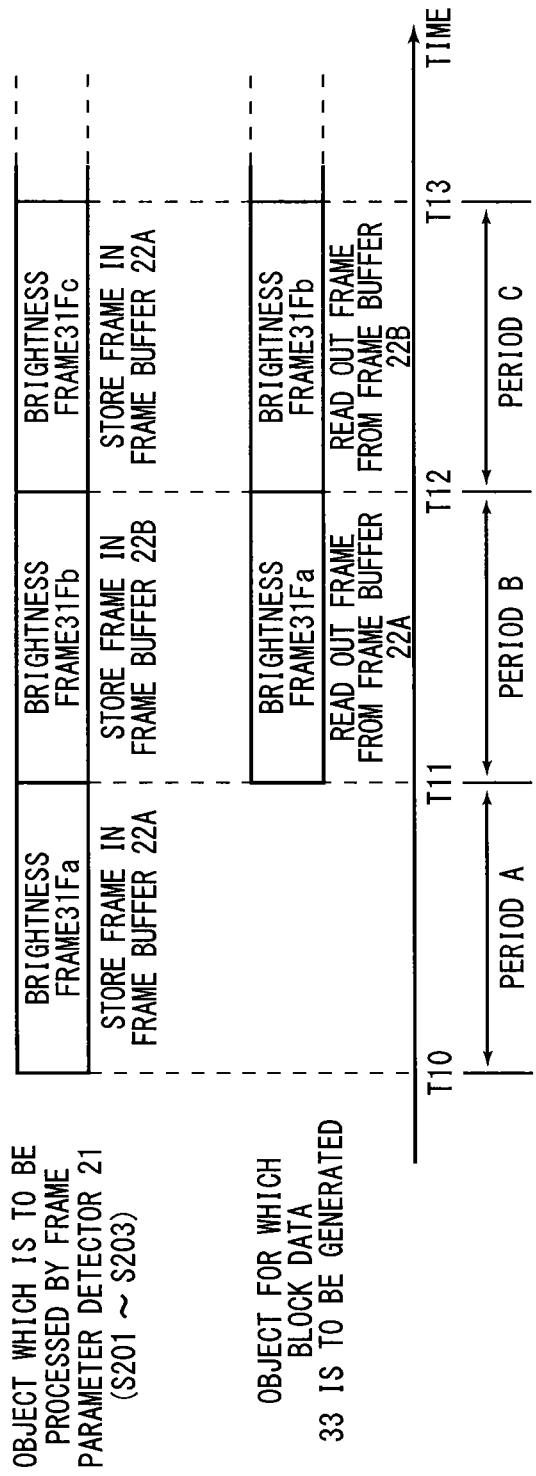
FIG. 4 shows a correspondence between a brightness frame processed by a frame parameter detector shown in FIG. 1 and a brightness frame from which block data is to be generated.
Figure 5:
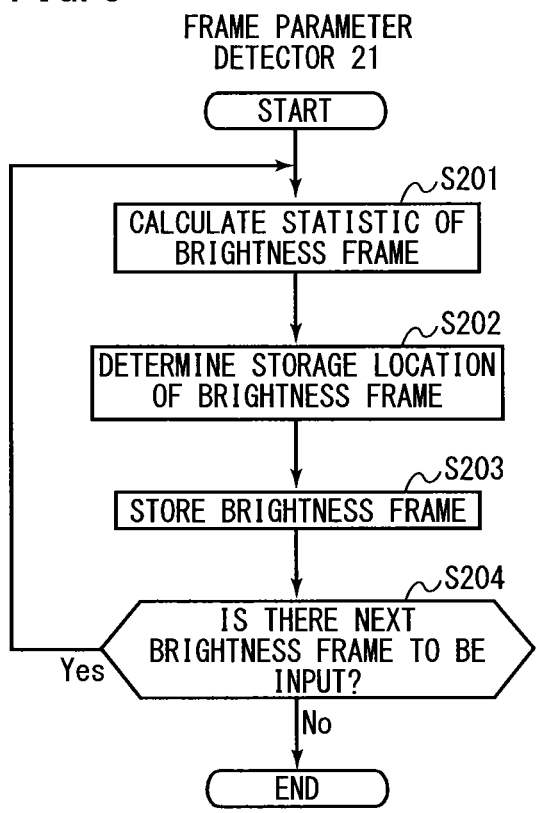
FIG. 5 is a flow chart showing operations of the frame parameter detector shown in FIG. 1.

FIG. 4 is a timing diagram showing a correspondence between the brightness frame 31F processed by the frame parameter detector 21 and the brightness frame 31F from which the block data 33 is to be generated. FIG. 5 is a flow chart showing operations of the frame parameter detector 21. Storage of the brightness frame 31F and generation of the block data 33 are achieved in parallel with each other (refer to FIG. 4), though details thereof will be later provided.

Now, operations of the frame parameter detector 21 will be described with reference to FIGS. 4 and 5. The input interface 1 receives data of a moving image photographed by the vehicle-mounted camera not shown, and outputs brightness frames 31Fa, 31Fb, 31Fc, ... sequentially, to the pre-processing unit 2. When the brightness frame 31Fa is input to the pre-processing unit 2, processes shown in FIG. 5 are started.

The frame parameter detector 21 calculates the statistical values 31 of the brightness frame 31Fa (step S201). The maximum value, the minimum value, a sum, a variance, and a standard deviation of pixels included in the brightness frame 31Fa are calculated as the statistical values 31. The frame parameter detector 21 designates the frame buffer 22A as a storage location of the brightness frame 31Fa (step S202). The brightness frame 31F is stored in the frame buffer 22A (step S203).

The pre-processing unit 2 receives the brightness frame 31Fb as a next frame following after the brightness frame 31Fa. The statistical values 31 of the brightness frame 31Fb are calculated (step S201). The frame buffer 22B is designated as a storage location of the brightness frame 31Fb (step S202). Thereafter, until all of the brightness frames 31F are completely input ("No", in step S204), processes from the step S201 to the step S204 are repeated. As shown in FIG. 4, a storage location of the brightness frame 31F alternates between the frame buffers 22A and 22B.

As shown in FIG. 4, respective periods in which the processes in the steps S201, S202, and S203 are carried out for the brightness frames 31Fa, 31Fb, and 31Fc are a period A, a period B, and a period C. Also, the pre-processing unit 2 generates the block data 33 by using the brightness frame 31F which is stored in the frame buffer 22A or 22B (details thereof will be later provided). Accordingly, a time when generation of the block data 33 can be started is a time T11 at which storage of the brightness frame 31Fa is finished. Thus, a process of generating the block data 33 from the brightness frame 31Fa is carried out in the period B. As described above, the brightness frame 31Fb which is to be input next to the brightness frame 31Fa is stored in the frame buffer 22B in the period B.

At a time T12, not only a process of generating the block data 33 from the brightness frame 31Fa is completed, but also a process of storing the brightness frame 31Fb in the frame buffer 22B is finished. The pre-processing unit 2 can start to generate the block data 33 from the brightness frame 31Fb at a time T12. By employing a double-buffered structure in the frame storage unit 22 in which the brightness frames 31F are stored, it is possible to carry out a process of the frame parameter detector 21 and a process of generating the block data 33 in parallel with each other. Therefore, image recognition processing can be achieved efficiently.

<3.2. Processes of the Block Parameter Detector 23 and the Block Generation Unit 24>

FIG. 6 is a flow chart showing operations of the pre-processing unit 2 in generating the block data 33. Processes shown in FIG. 6 are carried out by the block parameter detector 23 and the block generation unit 24.

(Determination of Block)

The pre-processing unit 2 determines which frame buffer should be a target of read-out (step S251). In a case where the block data 33 is generated from the brightness frame 31Fa, the frame buffer 22A is a target of read-out. The pre-processing unit 2 determines one detection block in which a pedestrian is to be detected, in the brightness frame 31F by using a preset block parameter table 221 (refer to FIG. 7A) (step S252). The block parameter table 221 is previously set in the pre-processing unit 2.

FIG. 7A shows the block parameter table 221 used to set the detection block BL_A. FIG. 7B shows a relationship between a detection block and a block parameter. Below, a process of determining a detection block (step S252) will be described in detail.

As shown in FIG. 7B, "FR_START_X", "FR_START_Y", "FR_SIZE_X", and "FR_SIZE_Y" are parameters which define an area 32F in which a pedestrian is to be detected in the brightness frame 31F. A detection block is determined in the area 32F. In the brightness frame 31F, there is an area where no pedestrian is likely to be detected. An upper area of the brightness frame 31F is sky in many cases. For this reason, no pedestrian is expected to be detected in the upper area. By determining a detection block within the area 32F, the number of detection blocks for which neuro calculation is to be performed can be reduced.

"BL_SIZE_X" and "BL_SIZE_Y" are parameters which determine sizes along an X direction and a Y direction of a detection block. "BL_START_X" and "BL_START_Y" are parameters which indicate coordinates of a detection block BL1 which is firstly determined in the area 32F, and correspond to coordinates of an upper-left vertex of the detection block BL1.

"BL_OFS_X" and "BL_OFS_Y" are offset values of an X coordinate and a Y coordinate of a detection block, and are used for calculating an upper-left vertex of a new detection block. For example, an X coordinate of an upper-left vertex of a detection block BL2 is a value obtained by adding "BL_OFS_X" to "BL_START_X". In calculating coordinates of an upper-left vertex of a detection block BL11 in the second stage, a value obtained by adding "BL_OFS_Y" to "BL_START_Y" is a Y coordinate of an upper-left vertex of the detection block BL11.

"BL_RPT_X" and "BL_RPT_Y" are parameters which determine the number of times of cutting out a detection block from the area 32F. For example, when "BL_RPT_X" is set at 10, the number of detection blocks which are cut out along an X axis is 10. When "BL_RPT_Y" is set at five, the number of detection blocks which are cut out along a Y axis is five.

The sequence of processes of determining a detection block will be described. The pre-processing unit 2 determines a detection block along an X axis the same number of times (10 times) as is set by "BL_RPTX", after determining the detection block BL1. More specifically, the detection blocks BL1, BL2, BL10 are sequentially determined in the first stage. Next, the pre-processing unit 2 sequentially determines detection blocks (BL11 to BL20) in the second stage. When "BL_RPT_Y" is set at five, the pre-processing unit 2 repeats the above-described processes until the detection blocks in the fifth stage are determined. As a result, 50 detection blocks are designated as areas in each of which a pedestrian is to be detected.

The block parameter table 221 is prepared in accordance with each of the sizes of the detection blocks BL_A and BL_B. The block parameter table 221 shown in FIG. 7A corresponds to the detection block BL_A. The pre-processing unit 2 determines a detection block using the block parameter table 221 corresponding to the detection block BL_A, and thereafter, determines a detection block using the block parameter table 221 corresponding to the detection block BL_B.

Refer back to FIG. 6. The block parameter detector 23 calculates the statistical values 32 of the detection block which is determined (step S253). For calculation of the statistical values 32, a brightness value of the brightness frame 31F stored in the frame storage unit 22 is used. The maximum value, the minimum value, a sum, a variance, and a standard deviation of pixels in the detection block are calculated as the statistical values 32. Below, description will be made by taking a case of generating the block data 33 of the detection block BL1, as an example.

(Normalization of Brightness Frame)

The block generation unit 24 normalizes the brightness frame 31F using the statistical values 31 of the brightness frame 31F (step S254). Normalization of the brightness frame 31F is a process of changing each of pixel values (brightness values) of the brightness frame 31F so as to agree with a preset typical brightness distribution. The neuro calculation process (step S3, refer to FIG. 2) is performed assuming that the block data 33 for which neuro calculation is to be performed has a typical brightness distribution. If a brightness distribution of the brightness frame 31F has a bias, it is considered that also a brightness distribution of the block data 33 has a bias.

For example, a brightness value of the brightness frame 31F obtained by photographing at night time is low as a whole. If neuro calculation is performed without normalizing such the brightness frame 31F, it is probable that no pedestrian is detected. However, by normalizing the brightness frame 31F, it is possible to prevent reduction of accuracy in detecting a pedestrian.

Subsequently, the block generation unit 24 cuts out image data of the detection block BL1 from the normalized brightness frame 31F, and further normalizes the image data of the detection block BL1 with the use of the statistical values 32 (step S255). Even though the brightness frame 31F is normalized, still there is variation in a spatial distribution of brightness. If an area covered by the detection block BL1 is dark in the normalized brightness frame 31F, it is probable that accuracy in neuro calculation for the detection block BL1 is reduced. Thus, also image data of the detection block BL1 is normalized in the same manner as the brightness frame 31F.

(Sobel Filter Process)

Hereinafter, image data of the normalized detection block BL1 will be referred to as "block image data". The block generation unit 24 carries out Sobel filter process on the block image data (step S256). Sobel filter process is a process of enhancing an edge of an object in an image.

Now, Sobel filter process will be described in detail. First, matrixes S0, S1, S2, and S3 each of which is a three-by-three matrix are defined as shown in <Formula 1>.

⟨Formula 1⟩

$$S0 = \begin{bmatrix} -1 & -1 & 0 \\ -1 & 0 & 1 \\ 0 & 1 & 1 \end{bmatrix}, S1 = \begin{bmatrix} 0 & -1 & -1 \\ 1 & 0 & -1 \\ 1 & 1 & 0 \end{bmatrix},$$

$$S2 = \begin{bmatrix} -1 & -1 & -1 \\ 0 & 0 & 0 \\ 1 & 1 & 1 \end{bmatrix}, S3 = \begin{bmatrix} -1 & 0 & 1 \\ -1 & 0 & 1 \\ -1 & 0 & 1 \end{bmatrix}$$

⟨Formula 1⟩

When block image data is expressed by a matrix P, the matrix P is as shown in <Formula 2>. In <Formula 2>, "M" indicates a coordinate in a horizontal direction (X-axis direction). "N" indicates a coordinate in a vertical direction (Y-axis direction).

⟨Formula 2⟩

$$P = \begin{bmatrix} p(0,0) & p(1,0) & \cdots & p(M-1,0) \\ p(0,1) & p(1,1) & \cdots & p(M-1,1) \\ \vdots & \vdots & \ddots & \vdots \\ p(0,N-1) & p(1,N-1) & \cdots & p(M-1,N-1) \end{bmatrix}$$

⟨Formula 2⟩

A pixel value of block image data after Sobel filter process will be denoted by "SBL(m, n)". Note that "(m, n)" are coordinates in an X-axis direction and a Y-axis direction. "SBL(m, n)" is calculated by <Formula 3>.

<Formula 3>

SBL(m,n)=Coring(|S0*P|)+Coring(|S1*P|)+Coring(|S2*P|) Coring(|S3*P|)   <Formula 3>

A coring function in <Formula 3> is expressed by the following <Formula 4>.

<Formula 4>

$$\text{Coring}(x) = \begin{cases} 0 & \text{, if } x \leq \text{SBL\_THRES0} \\ \dfrac{\text{SBL\_THRES0} \times (x - \text{SBL\_THRES0})}{\text{SBL\_THRES1} - \text{SBL\_THHRES0}} & \text{, if SBL\_THRES0} < x \leq \text{SBL\_THRES1} \\ x & \text{, if } x > \text{SBL\_THRES1} \end{cases} \quad \langle\text{Formula 4}\rangle$$

Also, an operator "*" in <Formula 3> indicates convolution. A formula of convolution is <Formula 5> as follows. A matrix S used in <Formula 5> is shown in <Formula 6>.

<Formula 5>

$$\text{out}(m, n) = S * P = \sum_{k=0}^{2} \sum_{r=o}^{2} s(k, r) p(m-k, n-r) \quad \langle\text{Formula 5}\rangle$$

<Formula 6>

$$S = \begin{bmatrix} S(0,0) & S(1,0) & S(2,0) \\ S(0,1) & S(1,1) & S(2,1) \\ S(0,2) & S(1,2) & S(2,2) \end{bmatrix} \quad \langle\text{Formula 6}\rangle$$

In <Formula 5>, "out(m, n)" indicates a pixel value of block image data after convolution. Also, "p(m-k, n-r)" indicates a pixel value of block image data before convolution. The matrix S is any one of the matrixes S0, S1, S2, and S3 shown in <Formula 1>, and "s(k, r)" is each element of the matrix S.

(Gaussian Filter Process)

Refer back to FIG. 6. The block generation unit 24 carries out Gaussian filter process on block image data in which an edge of an object is enhanced (step S257).

<Formula 7> shows a point spread function W used in Gaussian filter process. A point spread function W is a five-by-five matrix.

<Formula 7>

$$W = \begin{bmatrix} w(0,0) & w(1,0) & \cdots & w(4,0) \\ w(0,1) & w(1,1) & \cdots & w(4,1) \\ \vdots & \vdots & \ddots & \vdots \\ w(0,4) & w(0,4) & \cdots & w(4,4) \end{bmatrix} = \quad \langle\text{Formula 7}\rangle$$

$$\begin{bmatrix} 1/256 & 4/256 & 6/256 & 4/256 & 1/256 \\ 4/256 & 16/256 & 24/256 & 16/256 & 4/256 \\ 6/256 & 24/256 & 36/256 & 24/256 & 6/256 \\ 4/256 & 16/256 & 24/256 & 16/256 & 4/256 \\ 1/256 & 4/256 & 6/256 & 4/256 & 1/256 \end{bmatrix}$$

A pixel of block image data after Gaussian filter process will be denoted by "g(m, n)". A matrix of pixels of block image data after Sobel filter process will be denoted by "P1". The matrix P1 has the same composition as that of <Formula 2>. Note that "g(m, n)" is obtained by performing convolution of the point spread function W and the matrix P1 as shown in <Formula 8>. As a result of Gaussian filter process, noises in block image data can be reduced.

<Formula 8>

$$g(m, n) = W * P1 = \sum_{k=0}^{4} \sum_{r=o}^{4} w(k, r) p(m-k, n-r) \quad \langle\text{Formula 8}\rangle$$

(Smoothing Process)

The pre-processing unit 2 performs a smoothing process (step S258) on block image data after Gaussian filter process. A matrix L used in a smoothing process is shown in <Formula 9>. The matrix L is a three-by-three matrix.

<Formula 9>

$$L = \begin{bmatrix} l(0,0) & l(1,0) & l(2,0) \\ l(0,1) & l(1,1) & l(2,1) \\ l(0,2) & l(1,2) & l(2,2) \end{bmatrix} = \begin{bmatrix} 1/9 & 1/9 & 1/9 \\ 1/9 & 1/9 & 1/9 \\ 1/9 & 1/9 & 1/9 \end{bmatrix} \quad \langle\text{Formula 9}\rangle$$

A pixel of block image data after a smoothing process will be denoted by "low(m, n)". A matrix of pixels of block image data after Gaussian filter process will be denoted by "P2". The matrix P2 has the same composition as that of <Formula 2>. As shown in <Formula 10>, "low(m, n)" is obtained by performing convolution of the matrix L and the matrix P2.

<Formula 10>

$$\text{low}(m, n) = L * P2 = \sum_{k=0}^{1} \sum_{r=o}^{2} l(k, r) p(m-k, n-r) \quad \langle\text{Formula 10}\rangle$$

Next, the block generation unit 24 changes a size of block image data on which a smoothing process has been performed, into a predetermined size (step S259). As a result of this, the block data 33 is generated. The size of the block data 33 is 16 pixels along an X-axis direction and 32 pixels along a Y-axis direction, for example (refer to FIG. 3B). For a change in size of block image data, linear interpolation can be used.

The block generation unit 24 stores the block data 33 into either the block buffer 3A or the block buffer 3B (step S260). The pre-processing unit 2 checks whether or not respective pieces of block data 33 which correspond to all of detection blocks are generated from the brightness frame 31F (step S261). If generation of the block data 33 is not finished ("No" in step S261), the pre-processing unit 2 turns back to the step S252, and repeats the processes from the step S252 to the step S261. If all pieces of block data 33 are generated ("Yes" in step S261), the pre-processing unit 2 terminates the flow chart in FIG. 6. The pre-processing unit 2 then starts the flow chart in FIG. 6 again in order to generate the block data 33 from the next brightness frame 31F.

<4. Writing and Read-Out Performed on Block Buffer>

The pre-processing unit 2 stores the generated block data 33 into either the block buffer 3A or 3B (refer to FIG. 1) in the step S260. The neuro calculation unit 4 reads out the block data 33 from either the block buffer 3A or 3B, and performs neuro calculation on the read block data 33 (step S3, refer to FIG. 2).

The image recognition apparatus 100 is able to perform a process of generating the block data 33 (refer to FIG. 6) and the neuro calculation process (step S3) in parallel because of inclusion of two block buffers therein. As a result, a process of detecting a pedestrian in the frame 30F can be carried out efficiently.

FIG. 8 is a timing diagram showing when readout and writing are performed on the block buffers 3A and 3B. The pre-processing unit 2 generates the block data 33 of the detection block BL1 (refer to FIG. 7B) and writes the generated block data 33 into the block buffer 3A in a period from a time T20 to a time T21. Up to a time T21, the block data 33 is not written into any of the block buffers 3A and 3B, so that the neuro calculation process (step S3) is not carried out.

At a time T21, writing of the block data 33 of the detection block BL1 is completed. The neuro calculation unit 4 starts the neuro calculation process (step S3) on the block data 33 of the detection block BL1 at a time T21. In other words, the neuro calculation unit 4 reads out the block data 33 of the detection block BL1 from the block buffer 3A in a period from a time T21 to a time T22. The pre-processing unit 2 generates the block data 33 of the detection block BL2 (refer to FIG. 7B) and writes the generated block data 33 into the block buffer 3B in a period from a time T21 to a time T22.

In a period from a time T22 to a time T23, the neuro calculation unit 4 reads out the block data 33 of the detection block BL2 from the block buffer 3B. The pre-processing unit 2 writes the block data 33 of the detection block BL3 (refer to FIG. 7B) into the block buffer 3A. Thereafter, a block buffer for writing and a block buffer for readout are interchanged with each other. That is, the block buffers 3A and 3B compose a ping-pong buffer. Thus, a process of generating the block data 33 and the neuro calculation process can be carried out in parallel.

<5. Neuro Calculation Process (Step S3)>

Hereinbelow, the neuro calculation process (step S3) will be described in detail.

<5.1. Outline of Neuro Calculation>

Figure 9:
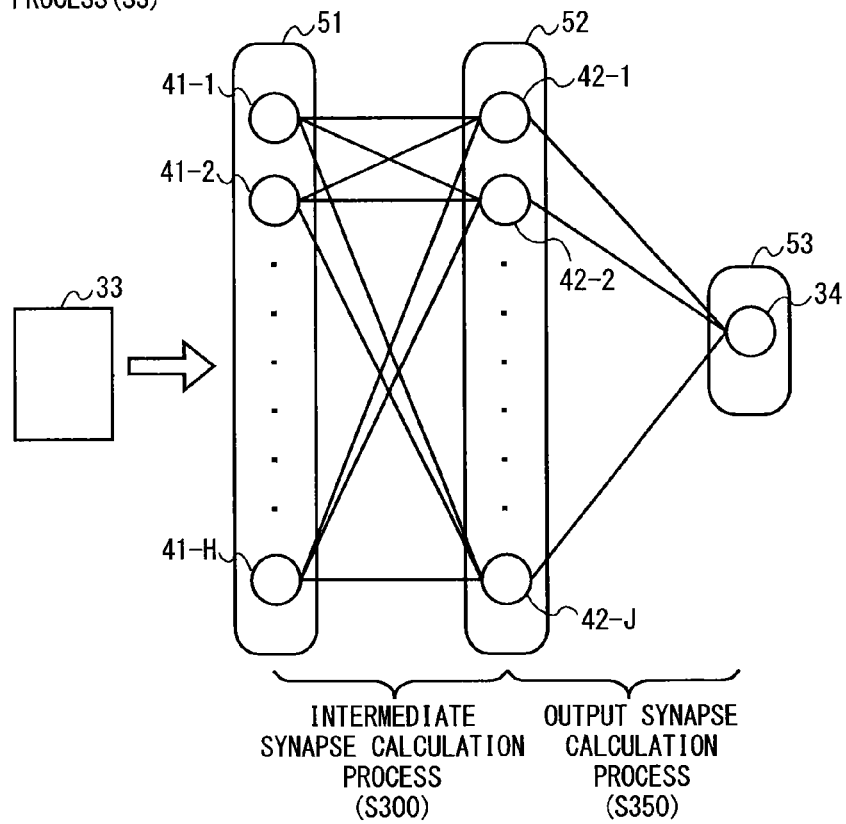
FIG. 9 is a schematic view showing a neuro calculation process shown in FIG. 2.

FIG. 9 is a schematic view showing the neuro calculation process (step S3) carried out by the neuro calculation unit 4. As shown in FIG. 9, the neuro calculation unit 4 performs neuro calculation on each of pixels of the block data 33, to thereby calculate the output synapse 34. The neuro calculation unit 4 performs neuro calculation with the use of three-layer perceptron including an input layer 51, an intermediate layer 52, and an output layer 53.

The input layer 51 includes input synapses 41-1 through 41-H. The input synapses 41-1 through 41-H respectively correspond to the pixels of the block data 33. Hereinafter, the input synapses 41-1 through 41-H may be collectively referred to as "input synapses 41", as occasion arises. The size of the block data 33 is 16×32 pixels, so that the number of the input synapses 41 is 512. The neuro calculation unit 4 carries out an intermediate synapse calculation process (step S300), to calculate synapses of the intermediate layer 52 (intermediate synapses) based on the input synapses 41.

The intermediate layer 52 includes intermediate synapses 42-1 through 42-J. In the preferred embodiment of the present invention, the number of the intermediate synapses is 256. However, the number of the intermediate synapses may be any other number that is equal to or smaller than the number of the input synapses 41.

The output synapse 34 is one piece of numeric data. The neuro calculation unit 4 carries out an output synapse calculation process (S350), to calculate the output synapse 34 based on the intermediate synapses 42-1 through 42-J.

Now, a method of calculating a synapse will be described. A method of calculating an intermediate synapse and a method of calculating an output synapse 34 are identical to each other. A formula for calculating a synapse is shown in <Formula 11>.

⟨Formula 11⟩

$$S_{out} = \varsigma\left(b_m + \sum_{i=1}^{n} w_i \times S_i\right)$$ ⟨Formula 11⟩

Figure 10:
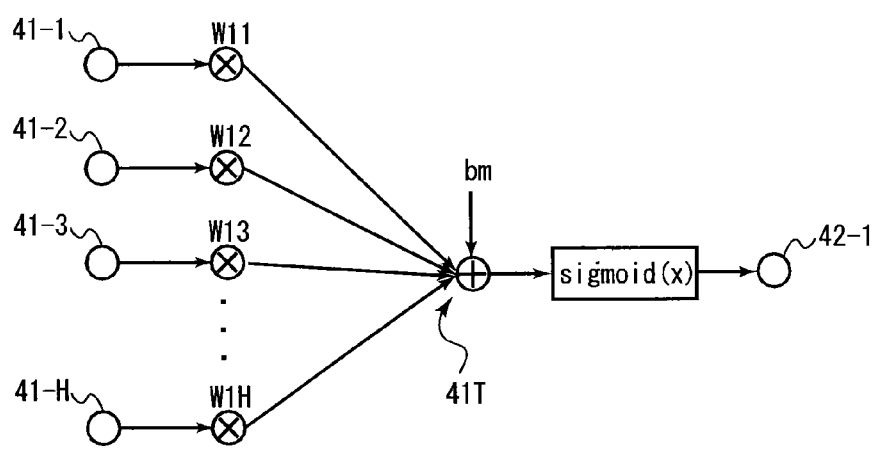
FIG. 10 is a schematic view showing a procedure for calculation of an intermediate synapse shown in FIG. 9.

More details of <Formula 11> will be provided by using calculation of the intermediate synapse 42-1 as an example. FIG. 10 is a schematic view showing a procedure for calculation of the intermediate synapse 42-1.

The input synapses 41-1 through 41-H correspond to "$S_i$" in <Formula 11>. Weighting coefficients $W_{11}$ through $W_{1H}$ which are respectively set in association with the input synapses 41 correspond to "$W_i$" in <Formula 11>. The weighting coefficients $W_i$ are stored in the coefficient table 5. In the preferred embodiment of the present invention, since an object of detection is a pedestrian, the weighting coefficients $W_i$ for a pedestrian are stored in the coefficient table 5. Additionally, by changing the weighting coefficients $W_i$ stored in the coefficient table 5, not only a pedestrian but also various objects such as an automobile and a traffic sign can be detected.

In <Formula 11>, "$b_m$" is an initial value of the intermediate synapse 42-1. A term of $\Sigma$ operator in <Formula 11> corresponds to a total value 41T, which is a sum of results obtained by respectively multiplying the input synapses 41 by the weighting coefficients. By substituting a sum of the total value 41T and the initial value $b_m$ into a sigmoid function, the intermediate synapse 42-1 can be obtained. A sigmoid function is shown in <Formula 12>.

⟨Formula 12⟩

$$\varsigma(x) = \frac{1}{1 + e^{ax}}$$ ⟨Formula 12⟩

As described above, the number of performances of multiplications and additions is extremely large in the neuro calculation process. Then, in order to speed up the neuro calculation process (step S3), the neuro calculation unit 4 performs a plurality of calculations in parallel in the intermediate synapse calculation process (S300) and the output synapse calculation process (S350). Below, each of the above-cited processes will be described in detail.

<5.2. Intermediate Synapse Calculation Process (Step S300)>

Figure 11:
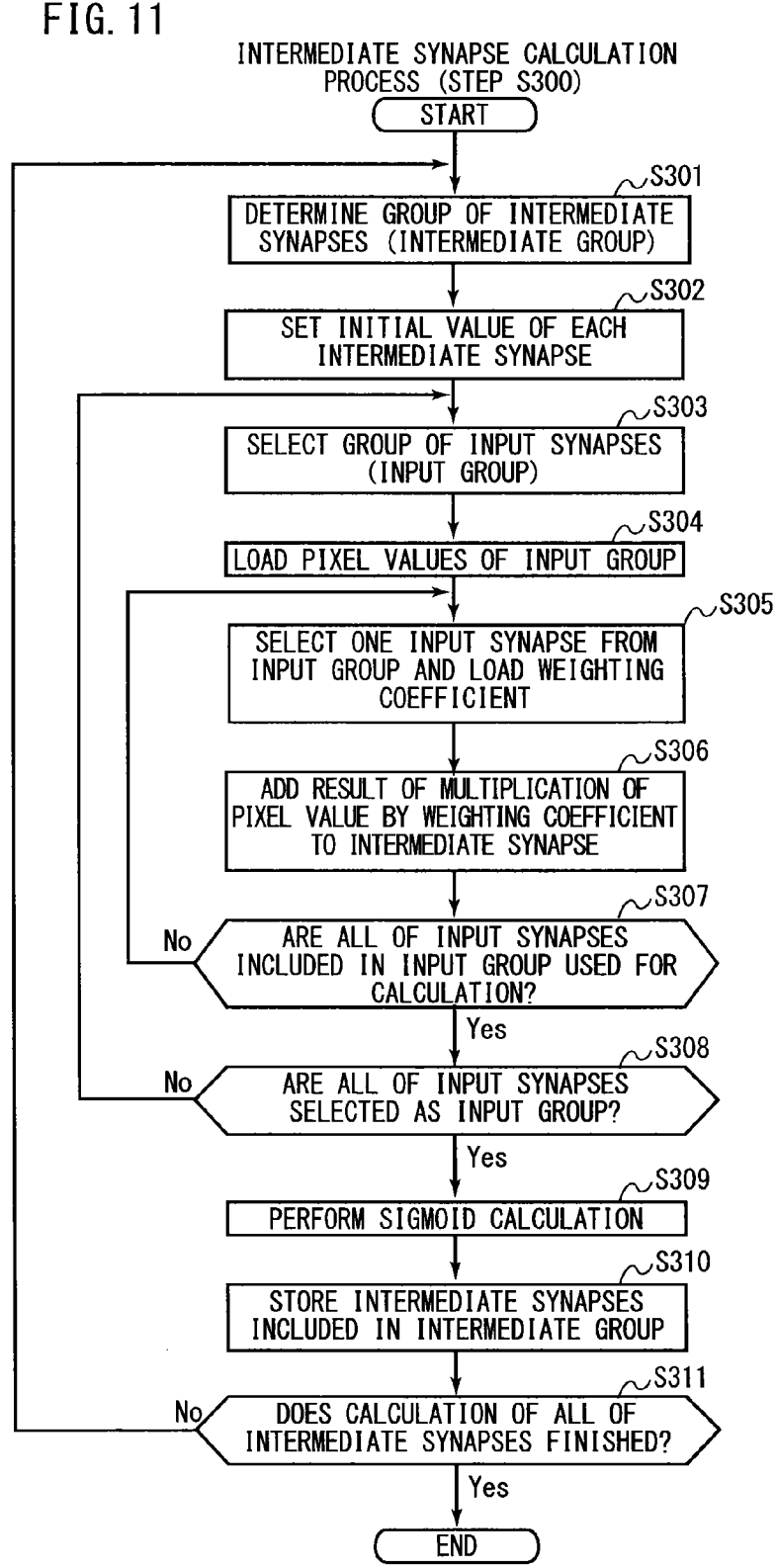
FIG. 11 is a flow chart of an intermediate synapse calculation process shown in FIG. 9.

FIG. 11 is a flow chart of the intermediate synapse calculation process (S300) carried out by the neuro calculation unit 4. FIGS. 12, 13, 14, 15, and 16 show respective situations in progresses in the course of calculation of intermediate synapses. Below, for the sake of simplification of description, description will be made by using a case where each of the number of input synapses 41 and the number of intermediate synapses is 12 as an example.

Figure 12:
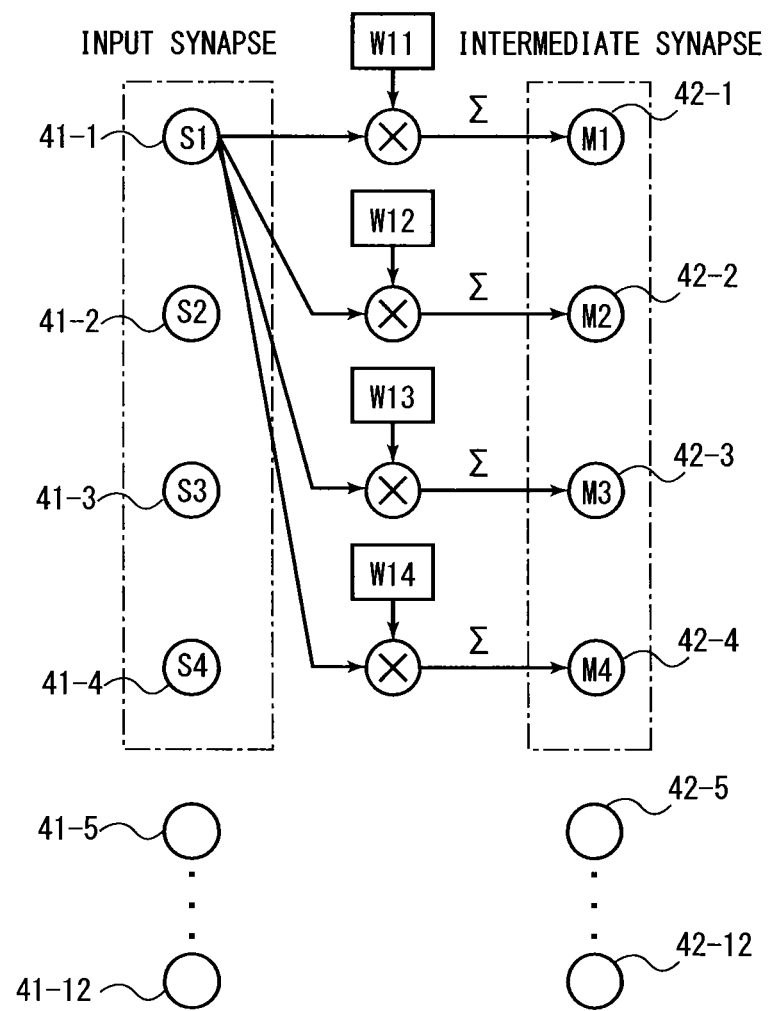
FIG. 12 shows a situation in progress in the course of the intermediate synapse calculation process shown in FIG. 9.

The neuro calculation unit 4 selects a group of intermediate synapses (intermediate group) which are to be calculated, from 12 intermediate synapses (step S301). As shown in FIG. 12, the intermediate synapses 42-1, 42-2, 42-3, and 42-4 are selected as an intermediate group. Respective numeric values of the intermediate synapses 42-1, 42-2, 42-3, and 42-4 are intermediate values M1, M2, M3, and M4. The neuro calculation unit 4 sets an initial value of each of the intermediate values M1, M2, M3, and M4 (step S302). The initial value corresponds to "$b_m$" in <Formula 11>, and is set for each of the intermediate synapses.

The neuro calculation unit 4 selects a group of the input synapses 41 (input group) which are used for calculation of the intermediate synapses 42-1, 42-2, 42-3, and 42-4 (step S303). At first, the input synapses 41-1, 41-2, 41-3, and 41-4 are selected as an input group. Pixel values S1, S2, S3, and S4 respectively corresponding to the input synapses 41-1, 41-2, 41-3, and 41-4 are loaded into a memory (not shown) (step S304). The neuro calculation unit 4 selects the input synapse 41-1 from the input group, and loads the weighting coefficients $W_{11}$, $W_{12}$, $W_{13}$, and $W_{14}$ associated with the input synapse 41-1 into the memory (not shown) (step S305). The weighting coefficients $W_{11}$, $W_{12}$, $W_{13}$, and $W_{14}$ are coefficients which are set in association with the input synapse 41-1 in order to calculate the intermediate synapses 42-1, 42-2, 42-3, and 42-4. The weighting coefficients $W_{11}$, $W_{12}$, $W_{13}$, and $W_{14}$ are loaded from the coefficient table 5.

The neuro calculation unit 4 multiplies the pixel value S1 by each of the weighting coefficients $W_{11}$, $W_{12}$, $W_{13}$, and $W_{14}$, and adds respective results of the multiplications to the intermediate values M1, M2, M3, and M4, respectively (step S306). More specifically, a result of multiplication of the pixel value S1 by the weighting coefficient $W_{11}$ is added to the intermediate value M1. A result of multiplication of the pixel value S1 by the weighting coefficient $W_{12}$ is added to the intermediate value M2. Similarly, respective results of multiplications of the pixel value S1 by the weighting coefficients $W_{13}$ and $W_{14}$ are added to the intermediate values M3 and M4, respectively.

Subsequently, the neuro calculation unit 4 checks whether or not all of the input synapses included in the input group are used for calculation of the intermediate values M1, M2, M3, and M4 (step S307). Since the input synapses 41-2, 41-3, and 41-4 are not yet selected ("No" in step S307), the neuro calculation unit 4 turns back to the step S305.

Figure 13:
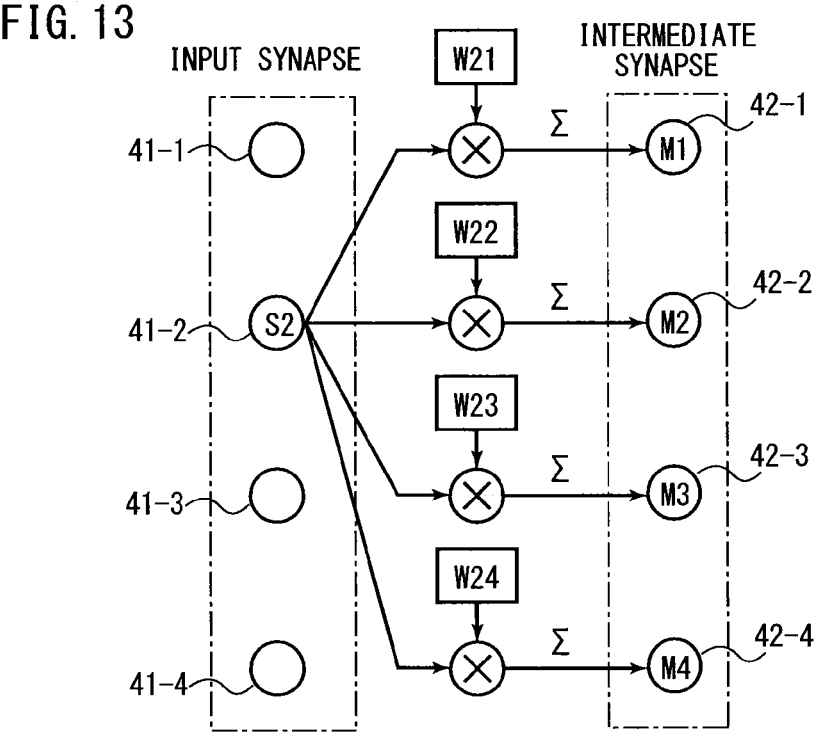
FIG. 13 shows a situation in progress in the course of the intermediate synapse calculation process shown in FIG. 9.

As shown in FIG. 13, the neuro calculation unit 4 carries out the processes in the steps S305 and S306 on the input synapse 41-2. Specifically, a result of multiplication of the pixel value S2 of the input synapse 41-2 by the weighting coefficient $W_{21}$ is added to the intermediate value M1. Similarly, respective results of multiplications of the pixel value S2 by the weighting coefficients $W_{22}$, $W_{23}$, and $W_{24}$ are added to the intermediate values M2, M3, and M4, respectively.

The neuro calculation unit 4 carries out the processes in the steps S305 and S306 also on the input synapse 41-3. Respective results of multiplications of the pixel value of the input synapse 41-3 by the weighting coefficients are added to the intermediate values M1, M2, M3, and M4, respectively.

Figure 14:
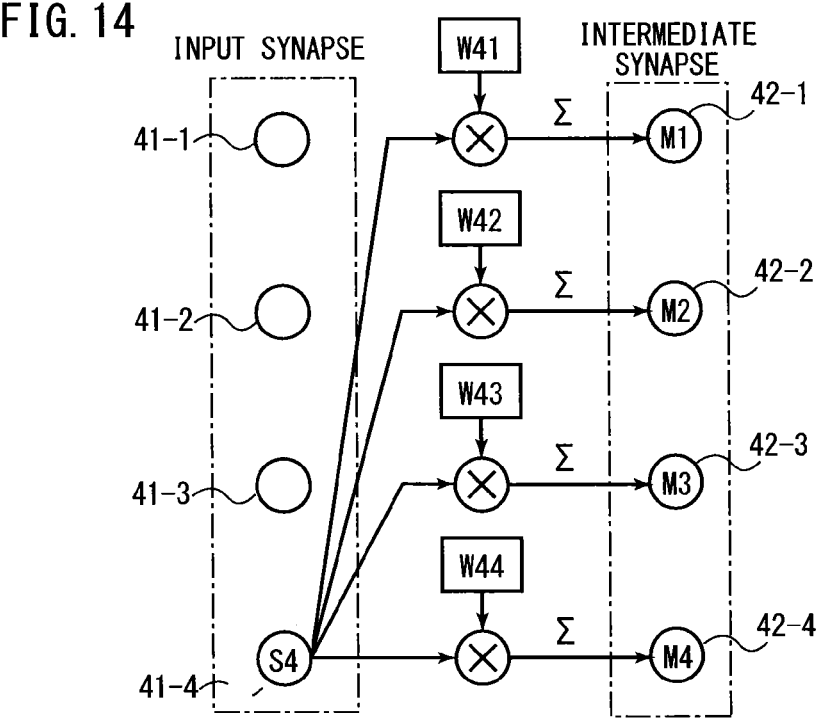
FIG. 14 shows a situation in progress in the course of the intermediate synapse calculation process shown in FIG. 9.

The neuro calculation unit 4 carries out the processes in the steps S305 and S306 also on the input synapse 41-4. As shown in FIG. 14, respective results of multiplications of the pixel value S4 of the input synapse 41-4 by the weighting coefficients $W_{41}$, $W_{42}$, $W_{43}$, and $W_{44}$ are added to the intermediate values M1, M2, M3, and M4, respectively.

Now, refer back to FIG. 11. Since the input synapses 41-1, 41-2, 41-3, and 41-4 are used for calculation of the intermediate values M1, M2, M3, and M4 ("Yes" in step S307), the neuro calculation unit 4 then checks whether or not all of the input synapses 41 are selected as an input group (step S308). The input synapses 41-5 through 41-12 are not selected as an input group ("No" in step S308), so that the neuro calculation unit 4 turns back to the step S303, and newly selects the input synapses 41-5, 41-6, 41-7, and 41-8 as an input group.

Figure 15:
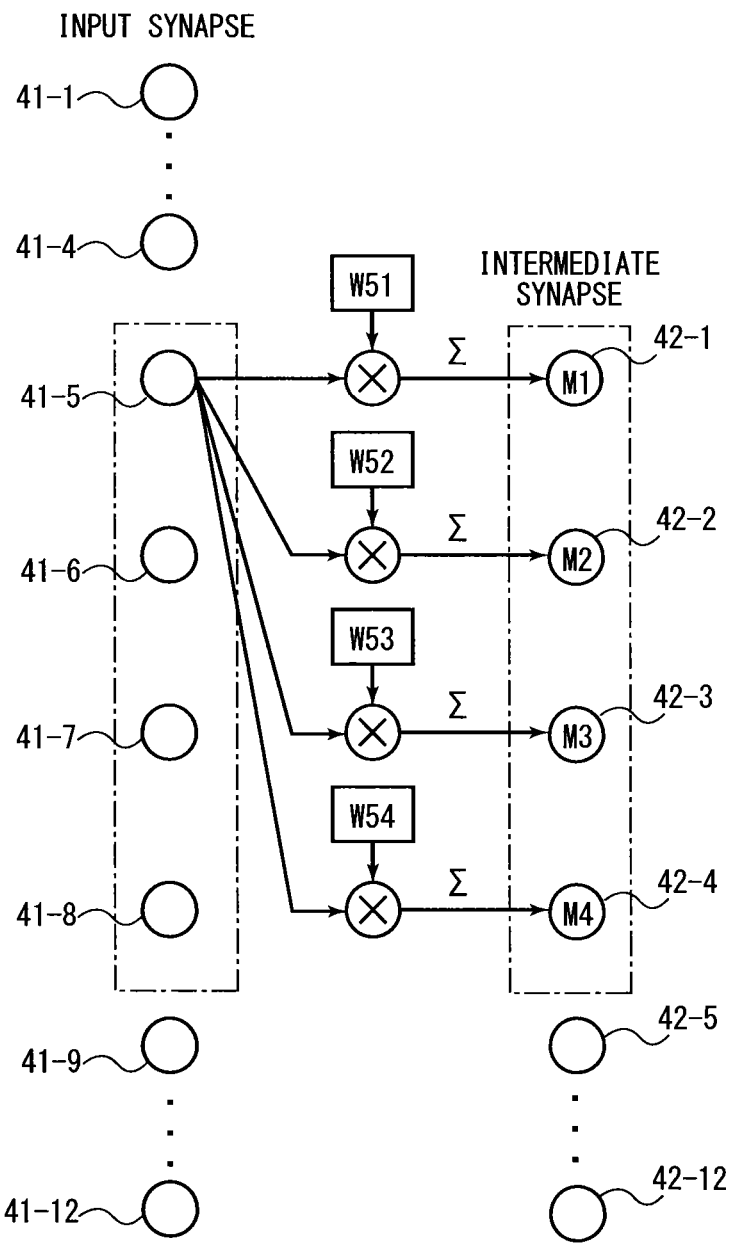
FIG. 15 shows a situation in progress in the course of the intermediate synapse calculation process shown in FIG. 9.

The neuro calculation unit 4 carries out the processes in the steps S305 and S306 on each of the input synapses 41-5, 41-6, 41-7, and 41-8. FIG. 15 shows processes of adding respective results of multiplications of the input synapse 41-5 by the weighting coefficients $W_{51}$, $W_{52}$, $W_{53}$, and $W_{54}$ to the intermediate values M1, M2, M3, and M4, respectively. Thereafter, until all of the input synapses 41 are selected as an input group ("Yes" in step S308), the processes in the steps S303 through S308 are repeated.

When all of the input synapses 41 are selected as an input group ("Yes" in step S308), the neuro calculation unit 4 inputs the intermediate values M1, M2, M3, and M4 into a sigmoid function (step S309). Results of calculation of a sigmoid function are stored in the memory not shown, as the intermediate synapses 42-1, 42-2, 42-3, and 42-4 (step S310).

As described above, out of the intermediate synapses 42, the intermediate synapses 42-1, 42-2, 42-3, and 42-4 are firstly calculated. Respective results of multiplications of the input synapse by the weighting coefficients are added to a plurality of intermediate values in parallel, so that four intermediate synapses 42 can be calculated at the same time. Therefore, the intermediate synapse calculation process (step S300) can be carried out at high speed.

Figure 16:
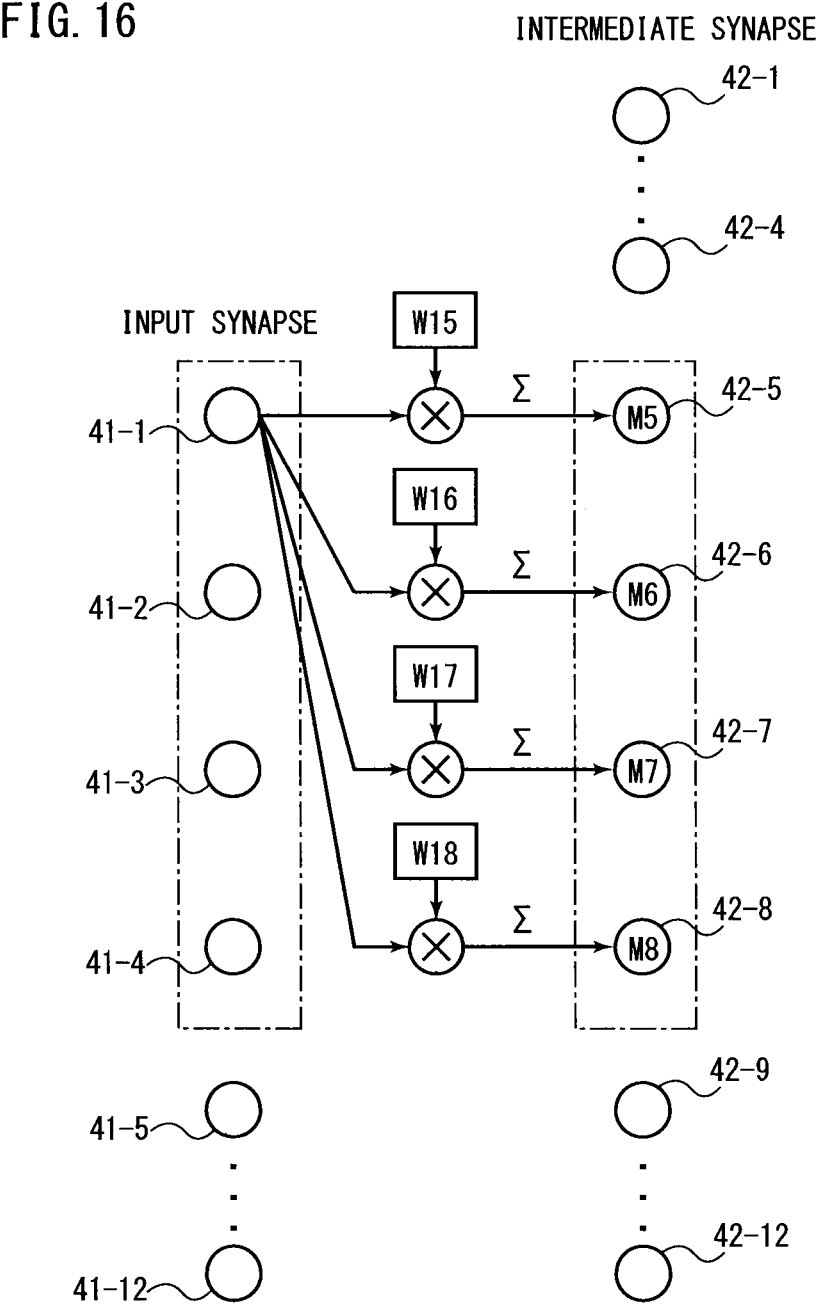
FIG. 16 shows a situation in progress in the course of the intermediate synapse calculation process shown in FIG. 9.

Refer back to FIG. 11. The neuro calculation unit 4 checks whether or not calculation of all of the intermediate synapses 42 is completed (step S311). Since the intermediate synapses 42-5 through 42-12 are not calculated, the neuro calculation unit 4 turns back to the step S301. As shown in FIG. 16, the neuro calculation unit 4 selects the intermediate synapses 42-5, 42-6, 42-7, and 42-8 as a new intermediate group (S301). The neuro calculation unit 4 carries out the steps S301 through S310 on the new intermediate group, to thereby calculate the intermediate synapses 42-5, 42-6, 42-7, and 42-8. Thereafter, until all of the intermediate synapses 42 are calculated ("Yes" in step S311), the steps S301 through S311 are repeated.

Figure 17:
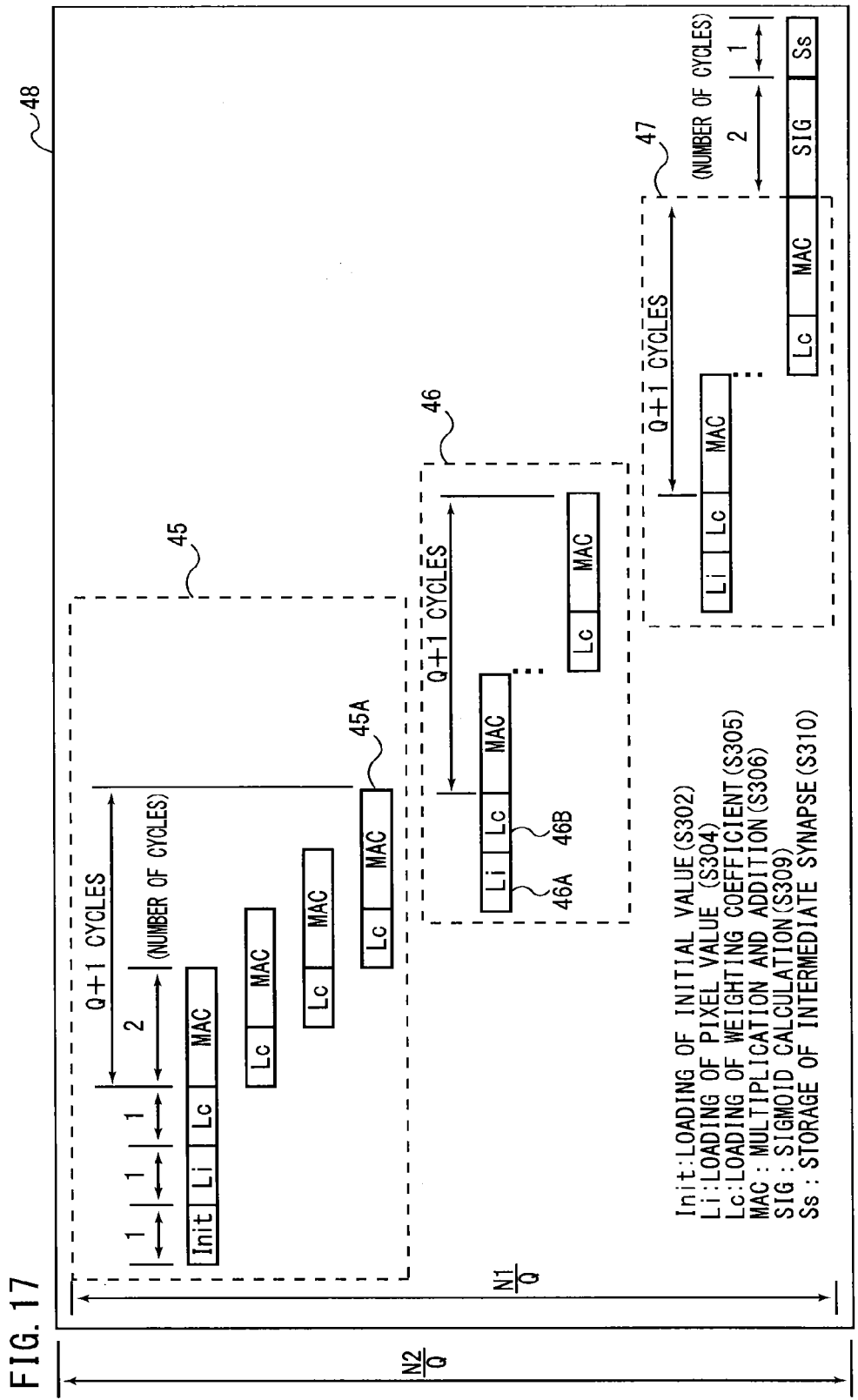
FIG. 17 is a timing diagram of the intermediate synapse calculation process shown in FIG. 9.

FIG. 17 is a timing diagram of the intermediate synapse calculation process (S300). In FIG. 17, "N1" denotes the number (12) of the input synapses 41. "N2" denotes the number (12) of the intermediate synapses 42. "Q" denotes the number (four) of the input synapses 41 included in an input group, and also the number (four) of the intermediate synapses included in an intermediate group.

A box 45 indicated by broken lines represents a process carried out when the input synapses 41-1, 41-2, 41-3, and 41-4 are selected as an input group. A box 46 represents a process carried out when the input synapses 41-5, 41-6, 41-7, and 41-8 are selected as an input group. A box 47 represents a process carried out when the input synapses 41-9, 41-10, 41-11, and 41-12 are selected as an input group. A box 48 represents a process of calculating the intermediate synapses in one intermediate group. In FIG. 17, one cycle corresponds to one cycle of a central processing unit (CPU).

In FIG. 17, "Init (Init process)" is a process of setting an initial value for each of intermediate values (step S302). "Li (Li process)" is a process of loading pixel values of the input synapses 41 which are selected as an input group (step S304). "Lc (Lc process)" is a process of loading the weighting coefficients (step S305). "MAC (MAC process)" includes a process of multiplying a pixel value of the input synapse by the weighting coefficients and a process of adding the results of the multiplications to the intermediate values (step S306). In the MAC process, two processes of multiplication and addition are carried out, so that the number of cycles of the MAC process is two. "SIG (SIG process)" is a calculation process using a sigmoid function (step S309). "Ss (Ss process)" is a process of storing the calculated intermediate values (step S310).

The MAC process will be described in detail. In the MAC process, calculation represented by a formula inside parentheses in <Formula 11> is performed. When the formula inside parentheses in <Formula 11> is defined as an operator "mac", the operator "mac" can be expressed by the following recurrence formula, <Formula 13>.

⟨Formula 13⟩

$$\begin{cases} mac(0) = b_m \\ mac(i) = mac(i-1) + S_i \times w_i \end{cases} \quad \text{⟨Formula 13⟩}$$

In the MAC process, a multiplication of $S_i \times W_i$ is performed in the first cycle. As described above, "$S_i$" corresponds to the input synapses 41-1 through 41-H (refer to FIG. 10). "$W_i$" corresponds to the weighting coefficients $W_{11}$ through $W_{1H}$ (refer to FIG. 10) which are respectively set in association with the input synapses 41-1 through 41-H. In the MAC process, a process of adding the result of multiplication ($W_i \times S_i$) to a result of calculation performed in the immediately preceding MAC process (mac(i−1)) is carried out in the second cycle. In this manner, the MAC process includes a process of multiplication and a process of addition, so that two cycles are required.

In each of the boxes 45, 46, and 47, the MAC process and the process of loading the weighting coefficients (Lc process) are carried out in parallel. As a result, the process of calculating the intermediate synapses 42 can be carried out efficiently.

Also, the MAC process 45A in the box 45 and the Li process 46A and the Lc process 46B in the box 46 are carried out in parallel. In other words, when an input group is newly set, the Li process and the Lc process therefor are carried out in parallel with the MAC process carried out for the immediately preceding input group. As a result, the neuro calculation unit 4 can efficiently carry out the process of calculating the intermediate synapses 42.

Next, the number of cycles required in the intermediate synapse calculation process (step S300) will be described. As shown in the boxes 45, 46, and 47, the number of cycles required in the MAC process for each of the input groups is Q±1. Further, in order to calculate all of the intermediate synapses 42 included in an intermediate group, the processes in the boxes 45, 46, and 47 must be repeated N1/Q times. The box 48 represents the process of calculating the intermediate synapses included in the intermediate group. Thus, in order to calculate all of the intermediate synapses, the process in the box 48 must be repeated N2/Q times. As a result, the number of cycles C1 required to calculate all of the intermediate synapses is expressed by <Formula 14>.

⟨Formula 14⟩

$$C1 = \left( \frac{(Q+1) \times N1}{Q} + 6 \right) \times \frac{N2}{Q} \quad \text{⟨Formula 14⟩}$$

In <Formula 14>, the term of "(Q+1)" represents a period in which the MAC process is carried out in the boxes 45, 46, and 47. Also, in the term of "6", the first three cycles correspond to the Init process, the Li process, and the Lc process for the first input group (the box 45). The remaining three cycles correspond to two cycles for the SIG process carried out after the process for the last input group (the box 47) and one cycle for the Ss process.

Next, the Li process and the Lc process will be described in detail. In <Formula 14>, "Q" indicates the number of parallels in the intermediate synapse calculation process (S300), namely, the number of intermediate synapses which are to be calculated in parallel. In the case shown in FIGS. 12,13,14,15, and 16, the number of parallels Q is four.

In a case where the number of bits of a pixel value S, of the input synapse 41 is set at "d", d×4-bit data is read out from either the block buffer 3A or 3B by the Li process. In a case where the number of bits of the weighting coefficient $W_i$ associated with the input synapse 41 is set at "e", e×4-bit data is read out from the coefficient table 5 by the Lc process. For example, if the number of bits d of the pixel value S, of the input synapse 41 is eight, the Li process causes 32-bit data to be read out from either the block buffer 3A or 3B. If the number of bits e of the weighting coefficient $W_i$ associated with the input synapse 41 is 16, the Lc process causes 64-bit data to be loaded into the memory from the coefficient table 5.

As described above, in the intermediate synapse calculation process (S300), each of the Li process and the Lc process requires one cycle for reading out data having bits in number corresponding to the number of parallels Q. As a result, it is possible to efficiently read out data necessary for the MAC process.

<5.3 Linear Approximation of Sigmoid Function>

As shown in <Formula 12>, a sigmoid function uses an exponential function. In the process of the step S309 (refer to FIG. 11), if a sigmoid function is used as it is, a calculation process becomes complicated, to require a considerable time for calculation of intermediate synapses. Thus, in order to simplify the process of the step S309, a linear approximate function of a sigmoid function is employed. The linear approximate function is shown in <Formula 15>.

⟨Formula 15⟩

$$S_1(x) = \begin{cases} 0 & \text{if } x \leq T_0 \\ \alpha_1 x + \beta_1 & \text{if } T_0 < x \leq T_1 \\ \alpha_2 x + \beta_2 & \text{if } T_1 < x \leq T_2 \\ \alpha_3 x + \beta_3 & \text{if } T_2 < x \leq T_3 \\ 1 & \text{if } x > T_3 \end{cases} \quad \text{⟨Formula 15⟩}$$

$$\text{where} \begin{cases} \alpha_1 = \alpha_3 \\ \beta_1 = 1 - \beta_3 \\ T_0 = -T_3 \\ T_1 = -T_2 \end{cases}$$

Figure 18:
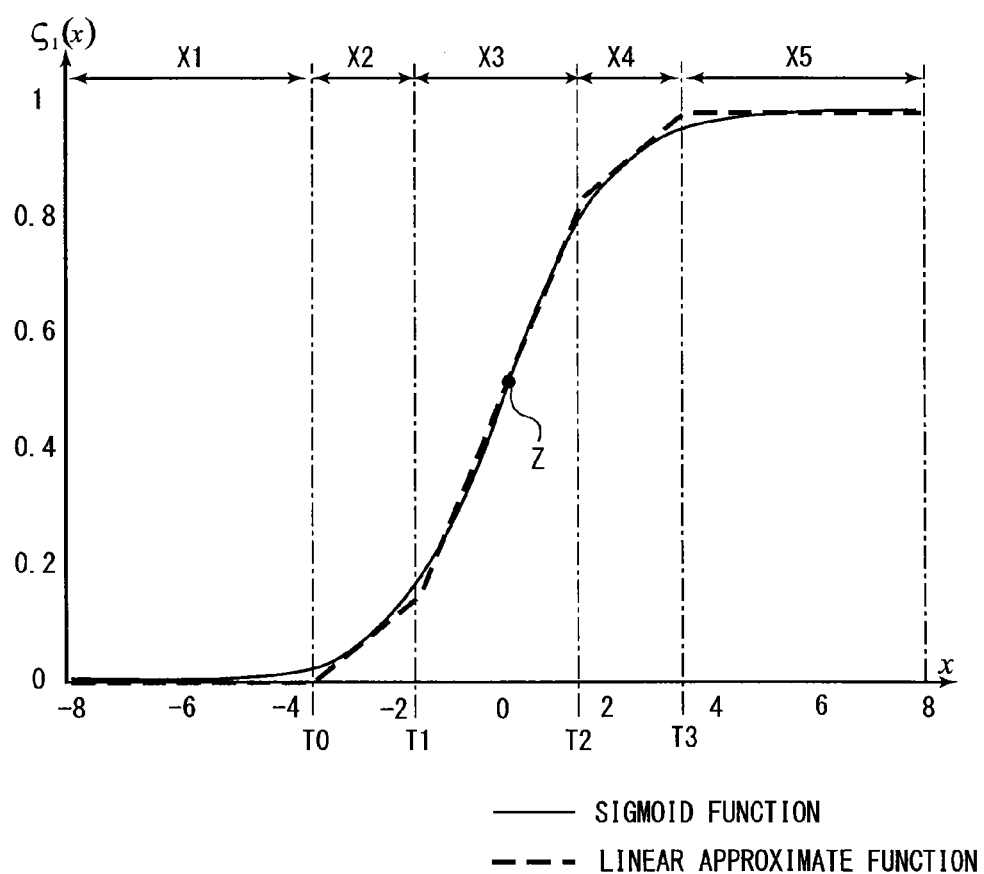
FIG. 18 shows a relationship between a sigmoid function and a linear approximate function which are used in a step S309 in FIG. 11.

FIG. 18 shows a relationship between a sigmoid function and a linear approximate function. In FIG. 18, a curve of a solid line represents a sigmoid function. Heavy broken lines represent a linear approximate function. As shown in <Formula 15>, a linear approximate function is partitioned into five sections (X1, X2, X3, X4, and X5). In FIG. 18, T0≈3.5, T1≈1.75, T2≈1.75, and T3≈3.5. By employing a linear approximate function, a result of calculation of a sigmoid function to which intermediate values are input can be obtained by a simple process. Accordingly, the process of calculating the intermediate synapses can be speeded up.

Additionally, a sigmoid function shown in FIG. 18 has point symmetry about a value Z where x=0. Accordingly, only the section where x≥0 may be set as a linear approximate function. By utilizing the property of a sigmoid function which has a point symmetry, it is possible to obtain a result of calculation of a sigmoid function when x <0 based on a sigmoid function defined in the section where x ≥0.

<5.4. Output Synapse Calculation Process (Step S350)>

Figure 19:
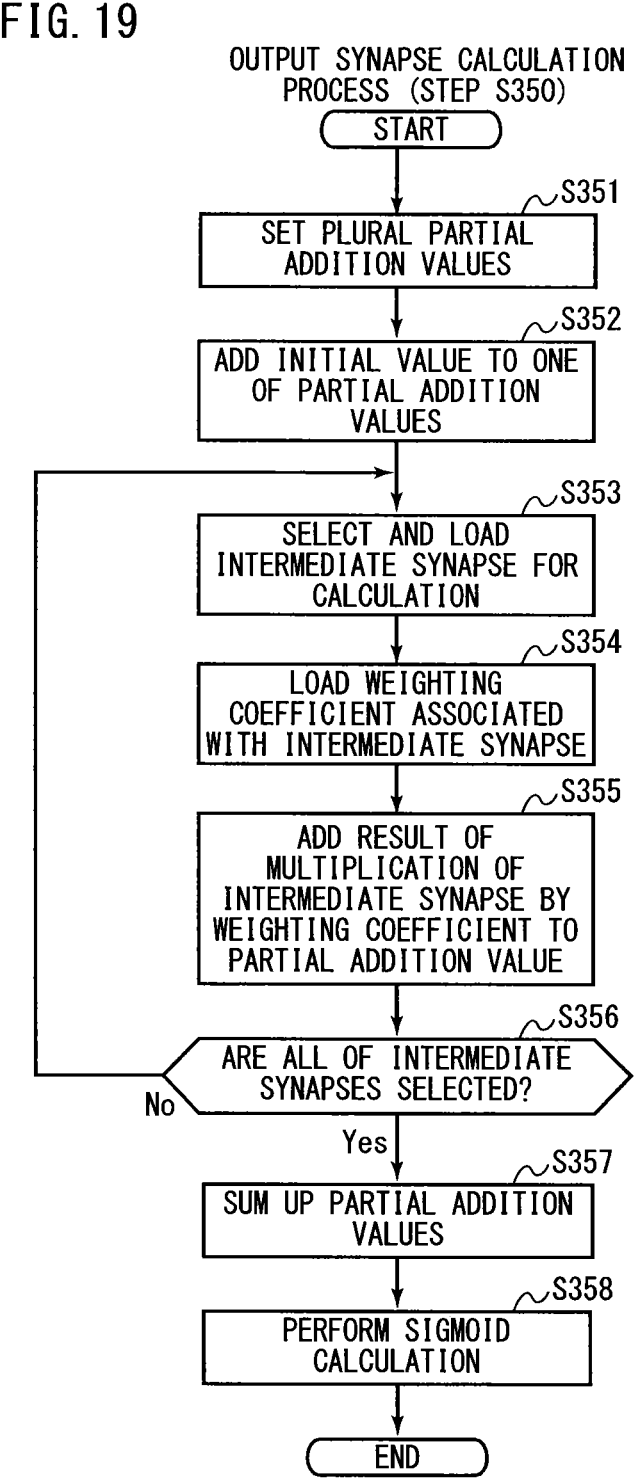
FIG. 19 is a flow chart of an output synapse calculation process shown in FIG. 9.

FIG. 19 is a flow chart of the output synapse calculation process (step S350) which is carried out by the neuro calculation unit 4. FIGS. 20, 21, 22, and 23 show respective situations in progress in the course of calculation of the output synapse 34. Hereinafter, description will be made by taking a case where the number of the intermediate synapses is 12 as an example, in the same manner as in the above description about the intermediate synapse calculation process (step S300).

Figure 20:
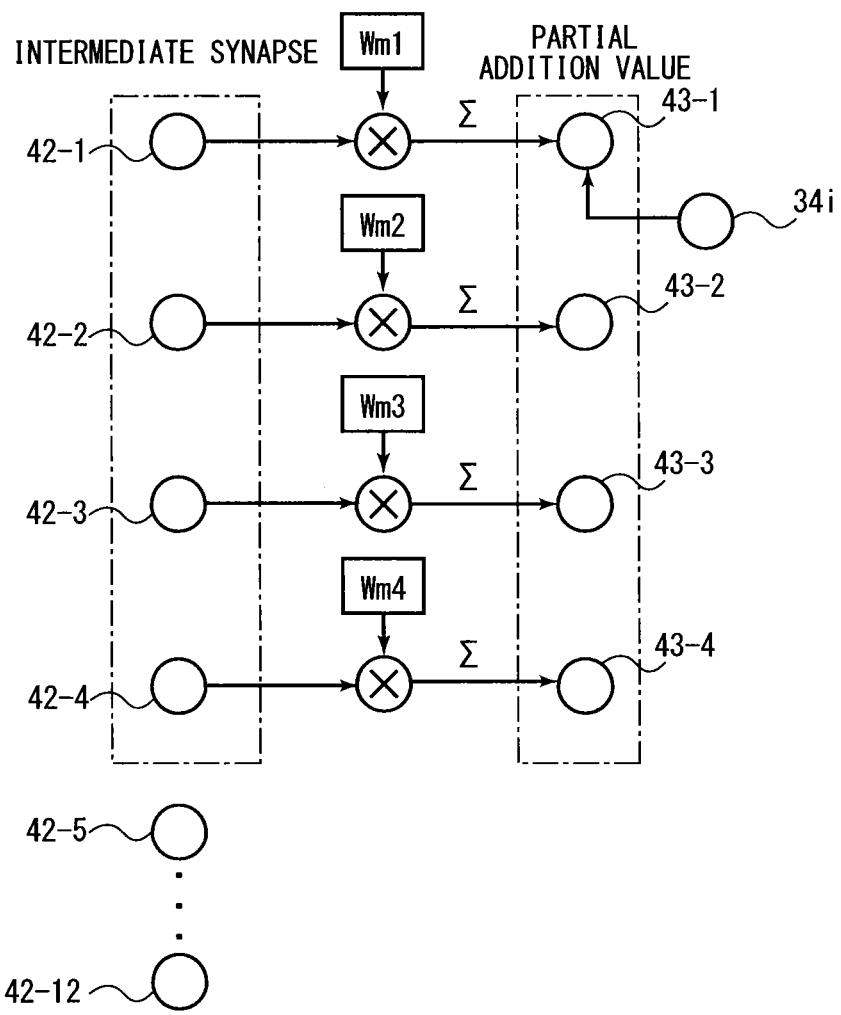
FIG. 20 shows a situation in progress in the course of the output synapse calculation process shown in FIG. 9.

The neuro calculation unit 4 sets four partial addition values 43-1, 43-2, 43-4, and 43-4 (step S351). The partial addition values 43-1, 43-2, 43-4, and 43-4 are temporary numerical values used for calculation of the output synapse 34, and each of them is initially set to 0. As shown in FIG. 20, the neuro calculation unit 4 provides an initial value 34i of the output synapse 34 to the partial addition value 43-1 (step S352). The initial value 34i is not provided to any of the partial addition values 43-2, 43-3, and 43-4. Since the partial addition values 43-1, 43-2, 43-3, and 43-4 are summed up at a later time, it is sufficient if the initial value 34i is provided to any one of the partial addition values 43-1, 43-2, 43-4, and 43-4.

Subsequently, the neuro calculation unit 4 selects four intermediate synapses 42-1, 42-2, 42-3, and 42-4 in accordance with the number of the partial addition values 43-1, 43-2, 43-4, and 43-4, and loads them into a memory (not shown) (step S353). Weighting coefficients $W_{m1}$, $W_{m2}$, $W_{m3}$, and $W_{m4}$ (refer to FIG. 20) which are respectively associated with the intermediate synapses 42-1, 42-2, 42-3, and 42-4 are loaded into the memory (step S354). The weighting coefficient $W_{m1}$ is set in the coefficient table 5, as data distinct from the weighting coefficient $W_{11}$, $W_{12}$, . . . (refer to FIG. 12) used for calculation of the intermediate synapse 42-1. This holds true for each of the weighting coefficients $W_{m2}$, $W_{m3}$, and $W_{m4}$.

After the step S354, respective results of multiplications of the intermediate synapses by the weighting coefficients are added to the partial addition values, respectively (step S355). As shown in FIG. 20, a result of multiplication of the intermediate synapse 42-1 by the weighting coefficient $W_{m1}$ is added to the partial addition value 43-1. Like this, respective results of multiplications of the intermediate synapses 42-2, 42-3, and 42-4 by the weighting coefficients $W_{m2}$, $W_{m3}$, and $W_{m4}$ are added to the partial addition values 43-2, 43-3, and 43-4, respectively.

As described above, in each of the processes of the steps S353, S354, and S355, a plurality of processes in accordance with the number (4) of the partial addition values are carried out in parallel, so that the output synapse calculation process (step S350) can be speeded up.

The neuro calculation unit 4 checks whether or not all of the intermediate synapses 42 are selected (step S356). Since the intermediate synapses 42-5 through 42-12 are not yet selected ("No" in the step S356), the neuro calculation unit 4 turns back to the step S353, selects the intermediate synapses 42-5, 42-6, 42-7, and 42-8, and loads them into the memory.

Figure 21:
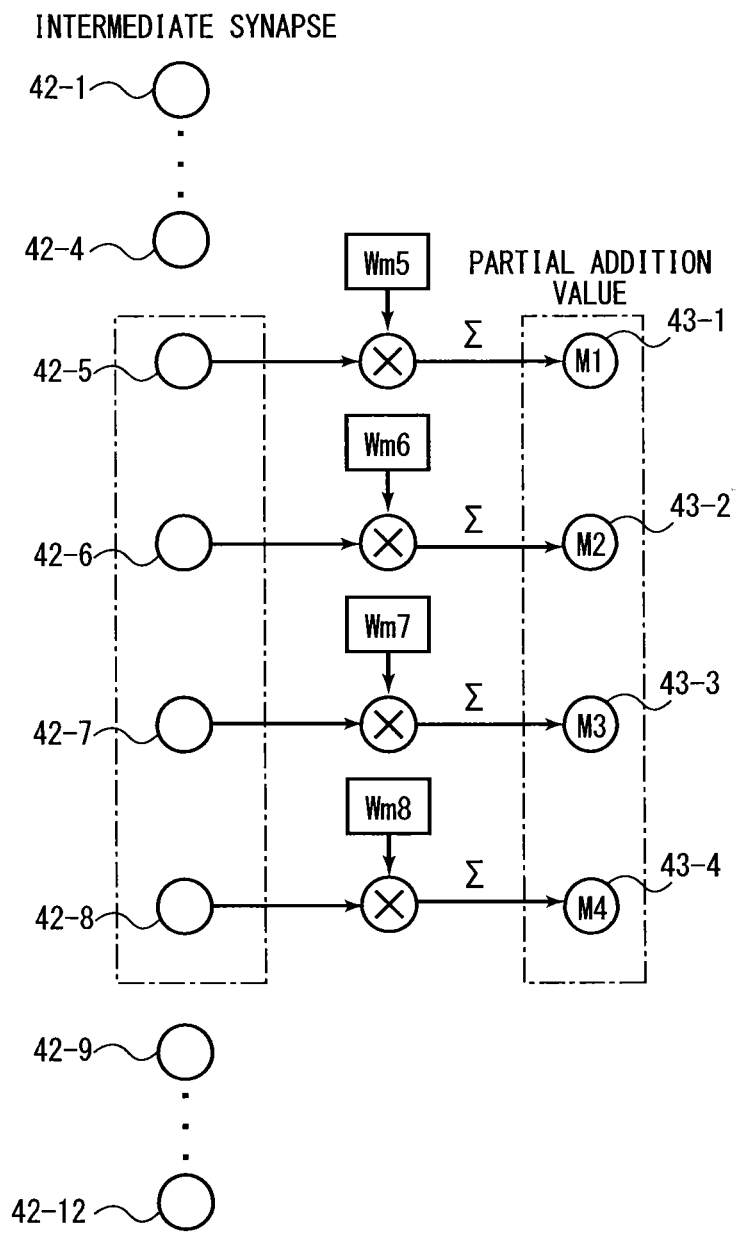
FIG. 21 shows a situation in progress in the course of the output synapse calculation process shown in FIG. 9.

The neuro calculation unit 4 carries out the processes of the steps S354 and S355 on the intermediate synapses 42-5, 42-6, 42-7, and 42-8. As shown in FIG. 21, a result of multiplication of the intermediate synapse 42-5 by a weighting coefficient $W_{m5}$ is added to the partial addition value 43-1. Like this, respective results of multiplications of the intermediate synapses 42-6, 42-7, and 42-8 by weighting coefficients $W_{m6}$, $W_{m7}$, and $W_{m8}$ are added to the partial addition values 43-2, 43-4, 43-5, respectively.

Figure 22:
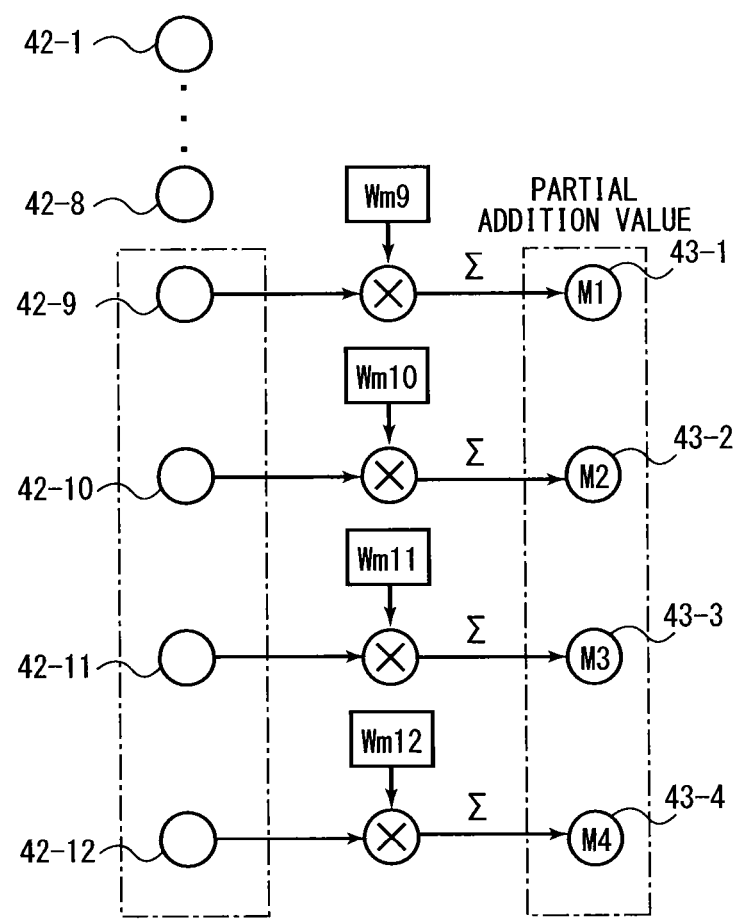
FIG. 22 shows a situation in progress in the course of an output synapse calculation process shown in FIG. 9.

Subsequently, the neuro calculation unit 4 selects the intermediate synapses 42-9, 42-10, 42-11, and 42-12 and loads them ("No" in step S356, step S353). The neuro calculation unit 4 carries out the processes of the steps S354 and S355 also on the intermediate synapses 42-9, 42-10, 42-11, and 42-12. As shown in FIG. 22, a result of multiplication of the intermediate synapse 42-9 by a weighting coefficient $W_{m9}$ is added to the partial addition value 43-1. Like this, respective results of multiplications of the intermediate synapses 42-10, 42-11, and 42-12 by the weighting coefficients $W_{m10}$, $W_{m11}$, and $W_{m12}$ are added to the partial addition values 43-2, 43-3, and 43-4, respectively. As all of the intermediate synapses are selected ("Yes" in step S356), the neuro calculation unit 4 determines that calculation of the partial addition values 43-1, 43-2, 43-3, and 43-4 is completed.

Figure 23:
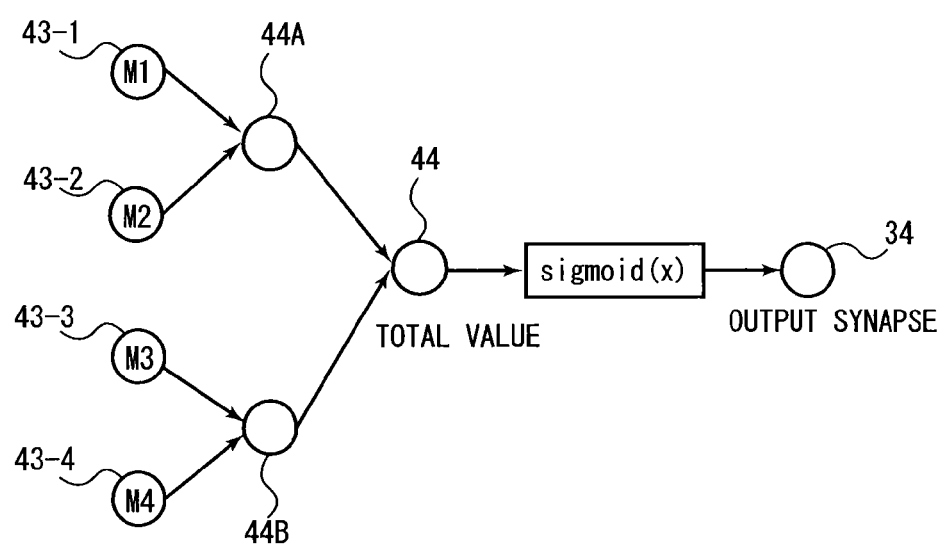
FIG. 23 shows a situation in progress in the course of an output synapse calculation process shown in FIG. 9.

The neuro calculation unit 4 sums up the partial addition values 43-1, 43-2, 43-4, and 43-4 (step S357), to thereby calculate a total value 44 (refer to FIG. 23). At that time, the process of the step S357 is carried out in a parallel manner. For example, in a case where the number of parallels for addition performed in the step S357 is two, the neuro calculation unit 4 firstly carries out a process of calculating a total value 44A of the partial addition values 43-1 and 43-2 and a process of calculating a total value 44B of the partial addition values 43-3 and 43-4 in parallel. Then, the total values 44A and 44B are summed up, so that the total value 44 is calculated. This can speed up the output synapse calculation process (step S350).

The neuro calculation unit 4 performs calculation of a sigmoid function to which the total value 44 is input (step S358), to thereby calculate the output synapse 34. Particulars of the process of the step S358 are identical to those of the step S309 (refer to FIG. 11). Then, the output synapse calculation process (step S350) is finished.

Figure 24:
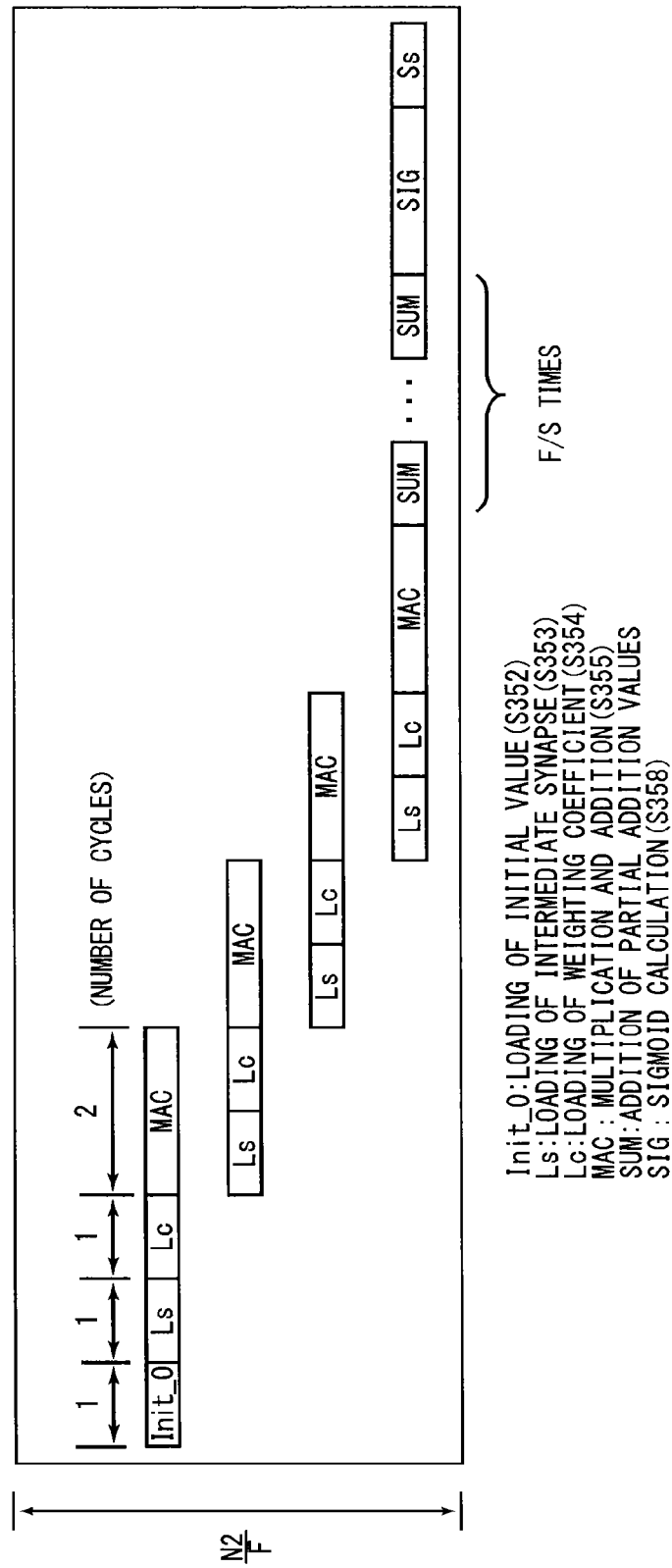
FIG. 24 is a timing diagram of the output synapse calculation process shown in FIG. 19.

FIG. 24 is a timing diagram of the output synapse calculation process (step S350). In FIG. 24, "N2" denotes the number (12) of the intermediate synapses. "F" denotes the number (four) of the partial addition values.

"Init_O (Init_O process)" is a process of providing the initial value 34i to the partial addition value 43-1, and corresponds to the step S352. "Ls (Ls process)" is a process of loading the selected intermediate synapses, and corresponds to the step S353. "Lc (Lc process)" is a process of loading the weighting coefficients associated with the loaded intermediate synapses, and corresponds to the step S354.

"MAC (MAC process)" includes a process of multiplying the intermediate synapses 42 by the weighting coefficients and a process of adding the results of the multiplications to the partial intermediate values, and corresponds to the step S355. The MAC process is identical to the MAC process shown in FIG. 17. The MAC process, in which multiplication and addition are performed, requires two cycles.

"SUM (SUM process)" is a process of summing up two partial addition values. The SUM process is repeated F/S times, so that the total value 44 is calculated (step S357). "S" is the number of parallels in an addition process carried out in the step S357. The number of cycles required for carrying out the SUM process one time is one. "Ss (Ss process)" is a process of storing the output synapse 34 in the memory of the neuro calculation unit 4, and is identical to the Ss process in FIG. 17. The number of cycles required for the Ss process is one.

Referring to FIG. 24, it can be appreciated that the MAC process, the Ls process, and the Lc process are carried out in parallel. For example, the process of the step S355 using the intermediate synapses 42-1, 42-2, 42-3, and 42-4 and the processes of the steps S353 and S354 using the intermediate synapses 42-5, 42-6, 42-7, and 42-8 are carried out in parallel. As a result, the output synapse calculation process (step S350) can be achieved efficiently.

Next, description will be made about the number of cycles required for the output synapse calculation process (S350). It is unnecessary to consider the number of cycles required for the Ls process and the Lc process which are carried out in parallel with the MAC process. The number of times the MAC process is carried out can be expressed by the number of intermediate synapses (N2=12)/the number of selections of intermediate synapses (F=4).

Besides, each of the Ls process and the Lc process is singly carried out one time. The SUM process (one cycle) is repeated F/S times. Each of the Init_O process (one cycle), the SIG process (two cycles), and the Ss process (one cycle) is singly carried out.

As a result, the number of cycles required for the output synapse calculation process (S350) can be expressed by <Formula 16>

⟨Formula 16⟩

$$C2 = \frac{N2}{F} \times 2 + \frac{F}{S} + 6 \qquad \text{⟨Formula 16⟩}$$

In <Formula 16>, the term of "(N2/F)×2" indicates the number of cycles required for the MAC process. The term of "F/S" indicates the number of times the SUM process is carried out. The term of "6" is a total value of the respective numbers of cycles required for the Init process, the Ls process, the Lc process, the SIG process, and the Ss process each of which is singly carried out.

Next, the Ls process and the Ls process which are carried out in the output synapse calculation process (S350) will be described in detail. In <Formula 16>, "F" denotes the number of parallels in the output synapse calculation process (S350), and corresponds to the number of the partial addition values. In the example shown in FIGS. 20, 21, and 22, the number of parallels F is four.

In a case where the intermediate synapse is f-bit data, f×4-bit data is loaded into a memory not shown by the Ls process. In a case where the number of bits of the weighting coefficient $W_i$ associated with the intermediate synapse is "g", g×4-bit data is read out from the coefficient table 5 by the Lc process. For example, if the intermediate synapse is 8-bit data, the Ls process causes 32-bit data to be loaded into the memory not shown. If the number of bits of the weighting coefficient $W_i$ is 16, the Lc process causes 64-bit data to be loaded into the memory from the coefficient table 5.

As described above, in the output synapse calculation process (S350), by each of the Li process and the Lc process requires one cycle for reading data having bits in number corresponding to the number of parallels F. This allows data necessary for the MAC process to be efficiently read out.

As is made clear from the above description, the image recognition apparatus 100 calculates a plurality of intermediate synapses 42 in parallel in the intermediate synapse calculation process (S300). Also, the image recognition apparatus 100 carries out processes of respectively adding respective results of multiplications of the intermediate synapses 42 by the weighting coefficients to the partial addition values, in parallel, in the output synapse calculation process (S350). In this manner, by carrying out various processes in parallel, it is possible to calculate the output synapse 34 at high speed.

Additionally, it is preferable that the neuro calculation unit 4 is composed by using a configurable processor. In a case where a general-purpose CPU or digital signal processor (DSP) is employed, the neuro calculation unit 4 is implemented by software processing. However, in some cases, the number of bits of data that can be loaded into a CPU or a DSP is fixed, and/or the number of commands that can be executed in parallel is fixed. For this reason, in carrying out the image recognition processing of the preferred embodiment of the present invention in real time, power consumption is increased because a CPU or DSP with a high clock frequency must be used.

In a case where the neuro calculation unit 4 is composed by using a hardware circuit, the circuit configuration is complicated to cause a problem of an increased cost. In such a case, the number of commands, synapses, stages of perceptron, and so on, which can be processed in parallel, cannot be easily changed.

A configurable processor is a processor to which a command compliant with the image recognition processing of the preferred embodiment of the present invention can be added. For example, the structure of the configurable processor can be changed so as to allow the weighting coefficients $W_i$ to be loaded in one cycle. Also, the structure of the configurable processor can be changed in accordance with the numbers of parallels in the intermediate synapse calculation process (S300) and the output synapse calculation process (S350). Even if a configurable processor having a lower clock frequency than a general-purpose CPU or DSP is used, the image recognition processing of the present embodiment of the present invention can be carried out in real time. Further, the particulars of neuro calculation can be changed more easily in this case than a case where the neuro calculation unit 4 is implemented by a hardware circuit. Therefore, the neuro calculation unit 4 which can handle image recognition processing for not only a pedestrian but also various objects can be easily implemented.

In the above preferred embodiment, description has been made about an example in which the block generation unit 24 normalizes the brightness frame 31F (step S254) before normalizing a detection block (step S255, refer to FIG. 6). However, the block generation unit 24 need not carry out the step S254. This will speed up a process of generating the block data 33. Also, instead of normalizing the brightness frame 31F every time a detection block is normalized, the brightness frame 31F which is normalized can be stored in a memory not shown. In this case, the block generation unit 24 normalizes the brightness frame 31F (step S255) before normalizing the first detection block, and need not normalize the brightness frame 31F when each of the second and subsequent detection blocks is normalized.

In the above preferred embodiment, description has been made about an example in which the neuro calculation unit 4 carries out neuro calculation with three-layer perceptron (refer to FIG. 9). However, the neuro calculation unit 4 can repeat the process of calculating intermediate synapses a plurality of times. For example, the neuro calculation unit 4 can calculate new intermediate synapses based on the intermediate synapses 42-1 through 42-J, and calculate the output synapse 34 based on the new intermediate synapses.

While the invention has been shown and described in detail, the foregoing description is in all aspects illustrative and not restrictive. It is therefore understood that numerous modifications and variations can be devised without departing from the scope of the invention.

The invention claimed is:

1. An image recognition apparatus configured to determine whether or not an object which is to be detected is included in a frame, comprising:
   circuitry configured to
   generate first calculation image data from a first area image in the frame, a size of the first calculation image data being smaller than that of the first area image;
   calculate a neuro calculation value which indicates whether or not the object which is to be detected is included in the first area image by performing neuro calculation on a pixel value of the first calculation image data;
   generate result data which indicates whether or not the object which is to be detected is included in the frame by using the neuro calculation value;
   carry out at least one intermediate synapse calculation process of performing neuro calculation on synapses in an input layer to calculate synapses in an intermediate layer;
   perform neuro calculation on the synapses in the intermediate layer to calculate an output synapse;
   output the output synapse as the neuro calculation value,
   wherein each of the synapses in the input layer in the first intermediate synapse calculation process is pixel values of the first calculation image data,
   wherein the circuitry is further configured to
   designate N intermediate synapses from the synapses in the intermediate layer as an object for calculation (N being a natural number greater than one);
   carry out a selecting process of selecting one input synapse from the synapses in the input layer;
   determine a weighting coefficient associated with the selected input synapse and the K-th intermediate synapse (K being a natural number equal to or smaller than N);
   perform an intermediate operation process of adding a result of multiplication of the selected input synapse by the determined weighting coefficient, to the K-th intermediate synapse; and
   perform respective intermediate operation processes on the first to N-th intermediate synapses, in parallel,
   wherein the selecting process and the intermediate operation process are repeated until all of input synapses are selected.

2. The image recognition apparatus according to claim 1, further comprising:
   a first block buffer configured to store the first calculation image data; and
   a second block buffer configured to store second calculation image data generated from a second area image in the frame by the circuitry, the second area image being different from the first area image, wherein
   the circuitry generates the second calculation image data and stores the second calculation image data in the second block buffer while performing neuro calculation by using the first calculation image data stored in the first block buffer, and
   the circuitry generates the first calculation image data and stores the first calculation image data in the first block buffer while performing neuro calculation by using the second calculation image data stored in the second block buffer.

3. The image recognition apparatus according to claim 1, wherein the circuitry is further configured to:
   statistically process pixel values in the first area image to calculate a block statistical value; and
   normalize pixel values in the first area image based on the block statistical value and a standard distribution data of pixel values in the first area image.

4. The image recognition apparatus according to claim 3, wherein the circuitry is further configured to:
   statistically process pixel values in the frame to calculate a frame statistical value,
   normalize pixel values in the frame based on the frame statistical value and a standard distribution data of pixel values in the frame, and
   normalize pixel values in the first area image by using the frame which is normalized.

5. The image recognition apparatus according to claim 1, further comprising:
   an input interface configured to receive a plurality of frames;
   a first frame buffer; and
   a second frame buffer, wherein
   the input interface stores a frame which is input next to a first frame stored in the first frame buffer into the second frame buffer while the first calculation image data is generated from the first frame.

6. The image recognition apparatus according to claim 1, wherein the circuitry is further configured to:
   determine a weighting coefficient used for a next intermediate operation process in a period of the intermediate operation process.

7. The image recognition apparatus according to claim 1, wherein
   the synapses in the input layer are divided into a plurality of input groups, and
   the circuitry is further configured to select one from the plurality of input groups,
   an input synapse on which the intermediate operation process is to be performed from the selected input group, and
   a next input group after all of input synapses included in the selected input group are selected.

8. The image recognition apparatus according to claim 7, further comprising:
   an input synapse buffer configured to store the synapses in the input layer; and
   a first coefficient table configured to store weighting coefficients used by the circuitry, wherein
   the circuitry is configured to read out all of input synapses included in the selected input group from the input synapse buffer by a one-time reading process, and reads out weighting coefficients determined from the first coefficient table by a one-time reading process.

9. The image recognition apparatus according to claim 7, wherein the circuitry is further configured to:
   carry out an intermediate operation process which is carried out on an input synapse lastly selected from the selected input group, and a process of selecting the next input group, in parallel.

10. The image recognition apparatus according to claim 1, wherein the circuitry is further configured to:
    use intermediate synapses which are calculated immediately before, as input synapses when each of the second and subsequent intermediate operation processes is performed.

11. The image recognition apparatus according to claim 1, wherein the circuitry is further configured to:
    perform sigmoid calculation on intermediate synapses after intermediate calculation processes on all of input synapses are finished, wherein an approximate function obtained by linearly approximating a sigmoid function is used in the sigmoid calculation.

12. An image recognition apparatus configured to determine whether or not an object which is to be detected is included in a frame, comprising:
circuitry configured to
generate first calculation image data from a first area image in the frame, a size of the first calculation image data being smaller than that of the first area image;
calculate a neuro calculation value which indicates whether or not the object which is to be detected is included in the first area image by performing neuro calculation on a pixel value of the first calculation image data;
generate result data which indicates whether or not the object which is to be detected is included in the frame by using the neuro calculation value;
carry out at least one intermediate synapse calculation process of performing neuro calculation on synapses in an input layer to calculate synapses in an intermediate layer;
perform neuro calculation on the synapses in the intermediate layer to calculate an output synapse;
output the output synapse as the neuro calculation value, wherein
each of the synapses in the input layer in the first intermediate synapse calculation process is pixel values of the first calculation image data,
the circuitry is further configured to
set Q partial addition values which are used for calculation of the output synapse;
select Q intermediate synapses from the synapses in the intermediate layer, and perform a partial addition process of adding a result of multiplication of the R-th (R is a natural number equal to or smaller than Q) intermediate synapse included in the Q intermediate synapses by a weighting coefficient associated with the R-th intermediate synapse, to the R-th partial addition value; and
calculate a total value of the Q partial addition values after partial addition processes on all of intermediate synapses included in the synapses in the intermediate layer are finished, to calculate the output synapse, wherein
the partial addition processes using the Q intermediate synapses are carried out in parallel.

13. The image recognition apparatus according to claim 12, further comprising:
an intermediate synapse buffer configured to store the synapses in the intermediate layer; and
a second coefficient table configured to store weighting coefficients respectively associated with the synapses in the intermediate layer, wherein
the circuitry is configured to read out the Q intermediate synapses from the intermediate synapse buffer by a one-time reading process, and reads out the weighting coefficients respectively associated with the Q intermediate synapses from the second coefficient table by a one-time reading process.

14. The image recognition apparatus according to claim 12, wherein the circuitry is further configured to:
designate another Q intermediate synapses and weighting coefficients which are used for the next partial addition process in a period in which the partial addition process is carried out.

15. The image recognition apparatus according to claim 12, wherein the circuitry is further configured to:
perform sigmoid calculation on the total value of the Q partial addition values to calculate the output synapse after partial addition processes on all of the intermediate synapses are finished, wherein
an approximate function obtained by linearly approximating a sigmoid function is used in the sigmoid calculation.

16. The image recognition apparatus according to claim 12, further comprising:
a first block buffer configured to store the first calculation image data; and
a second block buffer configured to store second calculation image data generated from a second area image in the frame by the circuitry, the second area image being different from the first area image, wherein
the circuitry is further configured to
generate the second calculation image data and store the second calculation image data in the second block buffer while performing neuro calculation by using the first calculation image data stored in the first block buffer, and
generate the first calculation image data and store the first calculation image data in the first block buffer while performing neuro calculation by using the second calculation image data stored in the second block buffer.

17. The image recognition apparatus according to claim 12, wherein the circuitry is further configured to:
statistically process pixel values in the first area image to calculate a block statistical value; and
normalize pixel values in the first area image based on the block statistical value and a standard distribution data of pixel values in the first area image.

18. The image recognition apparatus according to claim 17, wherein the circuitry is further configured to:
statistically process pixel values in the frame to calculate a frame statistical value;
normalize pixel values in the frame based on the frame statistical value and a standard distribution data of pixel values in the frame; and
normalize pixel values in the first area image by using the frame which is normalized.

19. The image recognition apparatus according to claim 12, further comprising:
an input interface configured to receive a plurality of frames;
a first frame buffer; and
a second frame buffer,
wherein the input interface stores a frame which is input next to a first frame stored in the first frame buffer into the second frame buffer while the first calculation image data is generated from the first frame.

20. An image recognition apparatus configured to determine whether or not an object which is to be detected is included in a frame, comprising:
pre-processing circuitry configured to generate first calculation image data from a first area image in the frame, a size of the first calculation image data being smaller than that of the first area image;
neuro calculation circuitry configured to calculate a neuro calculation value which indicates whether or not the object which is to be detected is included in the first area image by performing neuro calculation on a pixel value of the first calculation image data; and
a post-processing circuitry configured to generate result data which indicates whether or not the object which is to be detected is included in the frame by using the neuro calculation value, wherein the neuro calculation circuitry includes
intermediate synapse calculation circuitry configured to carry out at least one intermediate synapse calculation process of performing neuro calculation on synapses in an input layer to calculate synapses in an intermediate layer, and
output synapse calculation circuitry configured to perform neuro calculation on the synapses in the intermediate layer to calculate an output synapse, and output the output synapse as the neuro calculation value, wherein each of the synapses in the input layer in the first intermediate synapse calculation process includes pixel values of the first calculation image data, the intermediate synapse calculation circuitry includes
object-for-calculation designation circuitry configured to designate N intermediate synapses from the synapses in the intermediate layer, (N being a natural number greater than one) as an object for calculation,
input synapse selection circuitry configured to carry out a selecting process of selecting one input synapse from the synapses in the input layer, and
intermediate operation circuitry configured to determine a weighting coefficient associated with the selected input synapse and the K-th (K is a natural number equal to or smaller than N) intermediate synapse, and perform an intermediate operation process of adding a result of multiplication of the selected input synapse by the determined weighting coefficient, to the K-th intermediate synapse,
wherein the intermediate operation circuitry performs respective intermediate operation processes on the first to N-th intermediate synapses, in parallel, and
wherein the selecting process and the intermediate operation process are repeated until all of input synapses are selected.

21. The image recognition apparatus according to claim 20, wherein the neuro calculation circuitry is implemented by a configurable processor.

22. An image recognition apparatus configured to determine whether or not an object which is to be detected is included in a frame, comprising:
pre-processing circuitry configured to generate first calculation image data from a first area image in the frame, a size of the first calculation image data being smaller than that of the first area image;

neuro calculation circuitry configured to calculate a neuro calculation value which indicates whether or not the object which is to be detected is included in the first area image by performing neuro calculation on a pixel value of the first calculation image data; and
post-processing circuitry configured to generate result data which indicates whether or not the object which is to be detected is included in the frame by using the neuro calculation value, the neuro calculation circuitry includes
intermediate synapse calculation circuitry configured to carry out at least one intermediate synapse calculation process of performing neuro calculation on synapses in an input layer to calculate synapses in an intermediate layer, and
output synapse calculation circuitry configured to perform neuro calculation on the synapses in the intermediate layer to calculate an output synapse, and output the output synapse as the neuro calculation value,
wherein each of the synapses in the input layer in the first intermediate synapse calculation process is pixel values of the first calculation image data, the output synapse calculation circuitry includes
partial addition value setting circuitry configured to set Q partial addition values which are used for calculation of the output synapse,
partial addition value calculation circuitry configured to select Q intermediate synapses from the synapses in the intermediate layer, and perform a partial addition process of adding a result of multiplication of the R-th (R is a natural number equal to or smaller than Q) intermediate synapse included in the Q intermediate synapses by a weighting coefficient associated with the R-th intermediate synapse, to the R-th partial addition value, and
summing circuitry configured to calculate a total value of the Q partial addition values after partial addition processes on all of intermediate synapses included in the synapses in the intermediate layer are finished, to calculate the output synapse,
wherein the partial addition processes using the Q intermediate synapses are carried out in parallel.

23. The image recognition apparatus according to claim 22, wherein the neuro calculation circuitry is implemented by a configurable processor.

* * * * *